(12) United States Patent
Harada et al.

(10) Patent No.: US 12,162,458 B2
(45) Date of Patent: Dec. 10, 2024

(54) VEHICLE CONTROL DEVICE

(71) Applicant: DENSO CORPORATION, Kariya (JP)

(72) Inventors: Akihiro Harada, Kariya (JP); Seiji Nakayama, Kariya (JP); Shigeru Kamio, Kariya (JP); Takuji Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/493,427

(22) Filed: Oct. 24, 2023

(65) Prior Publication Data

US 2024/0067142 A1 Feb. 29, 2024

Related U.S. Application Data

(63) Continuation of application No. PCT/JP2022/013995, filed on Mar. 24, 2022.

(30) Foreign Application Priority Data

Apr. 28, 2021 (JP) ................... 2021-076448

(51) Int. Cl.
*B60T 8/171* (2006.01)
*B60T 17/22* (2006.01)
*B60T 1/00* (2006.01)

(52) U.S. Cl.
CPC ............ *B60T 8/171* (2013.01); *B60T 17/221* (2013.01); *B60T 1/005* (2013.01); *B60T 2201/10* (2013.01); *B60T 2270/89* (2013.01)

(58) Field of Classification Search
CPC ........ B60T 8/171; B60T 17/221; B60T 1/005; B60T 2201/10
See application file for complete search history.

(56) References Cited

U.S. PATENT DOCUMENTS 11,346,444 B2 * 5/2022 Creech ............... F16H 63/3433
11,703,122 B2 * 7/2023 Kang ..................... F16H 61/32
                                                             701/51
(Continued)

FOREIGN PATENT DOCUMENTS

JP     2019122168 A      7/2019
WO    2022230479 A1     11/2022
(Continued)

OTHER PUBLICATIONS

U.S. Appl. No. 18/491,412 to Akihiro Harada et al., filed Oct. 20, 2023 (44 pages).

*Primary Examiner* — Derek D Knight
(74) *Attorney, Agent, or Firm* — Nixon & Vanderhye P.C.

(57) ABSTRACT

A vehicle control device includes: an actuator drive controller configured to control a drive of an actuator; a main motor drive controller configured to control a drive of a main motor; and a stuck determiner. The stuck determiner determines a stuck of the actuator based on a detection value of a sensor unit that detects a physical quantity changed according to a drive state of the actuator. The main motor drive controller is configured to perform an engaging surface pressure reduction control for reducing an engaging surface pressure between a parking gear and a parking lever by driving the main motor, when the stuck determiner determines that the actuator is stuck in releasing a parking lock of the vehicle.

12 Claims, 18 Drawing Sheets

(56) References Cited

U.S. PATENT DOCUMENTS

| | | | |
|---|---|---|---|
| 11,719,337 B2* | 8/2023 | Knapke | F16H 63/3433 |
| | | | 192/219.5 |
| 2020/0271221 A1 | 8/2020 | Kamio | |
| 2024/0042849 A1* | 2/2024 | Harada | B60K 26/02 |
| 2024/0042869 A1* | 2/2024 | Harada | F16H 59/50 |
| 2024/0059155 A1* | 2/2024 | Harada | F16H 63/3466 |

FOREIGN PATENT DOCUMENTS

| | | |
|---|---|---|
| WO | 2022230480 A1 | 11/2022 |
| WO | 2023276682 A1 | 1/2023 |
| WO | 2023276683 A1 | 1/2023 |

* cited by examiner ically, an electronic control device is known that
VEHICLE CONTROL DEVICE

CROSS REFERENCE TO RELATED APPLICATION

The present application is a continuation application of International Patent Application No. PCT/JP2022/013995 filed on Mar. 24, 2022, which designated the U.S. and claims the benefit of priority from Japanese Patent Application No. 2021-076448 filed on Apr. 28, 2021. The entire disclosures of all of the above applications are incorporated herein by reference.

TECHNICAL FIELD

The present disclosure relates to a vehicle control device.

BACKGROUND

Conventionally, an electronic control device is known that controls the operation of a parking lock mechanism via an actuator to switch a shift position of a shift range of an automatic transmission.

SUMMARY

A vehicle control device according to an aspect of the present disclosure controls a vehicle drive system. The vehicle drive system includes a main motor, a parking lock mechanism, and an actuator. The main motor is a source of drive power for driving a vehicle. The parking lock mechanism has a parking lever that can lock an axle of the vehicle by engaging with a parking gear connected to the axle, and can lock a rotation of the axle by an engagement of the parking gear and the parking lever. The actuator is capable of driving the parking lever.

For example, the vehicle control device includes an actuator drive controller configured to control a drive of the actuator, a main motor drive controller configured to control a drive of the main motor, and a stuck determiner configured to determine a stuck of the actuator based on a detection value of a rotation angle sensor that detects a physical quantity changed in accordance with a drive state of the actuator.

The main motor drive controller may be configured to drive the main motor and to perform an engaging surface pressure reduction control in which an engaging surface pressure between the parking gear and the parking lever is reduced, when the struck determiner determines that the actuator is stuck in releasing a parking lock.

BRIEF DESCRIPTION OF THE DRAWINGS

The above and other objects, features and advantages of the present disclosure will become more apparent from the below-described detailed description made with reference to the accompanying drawings. In the drawings.

DESCRIPTION OF EMBODIMENTS

Figure 1:
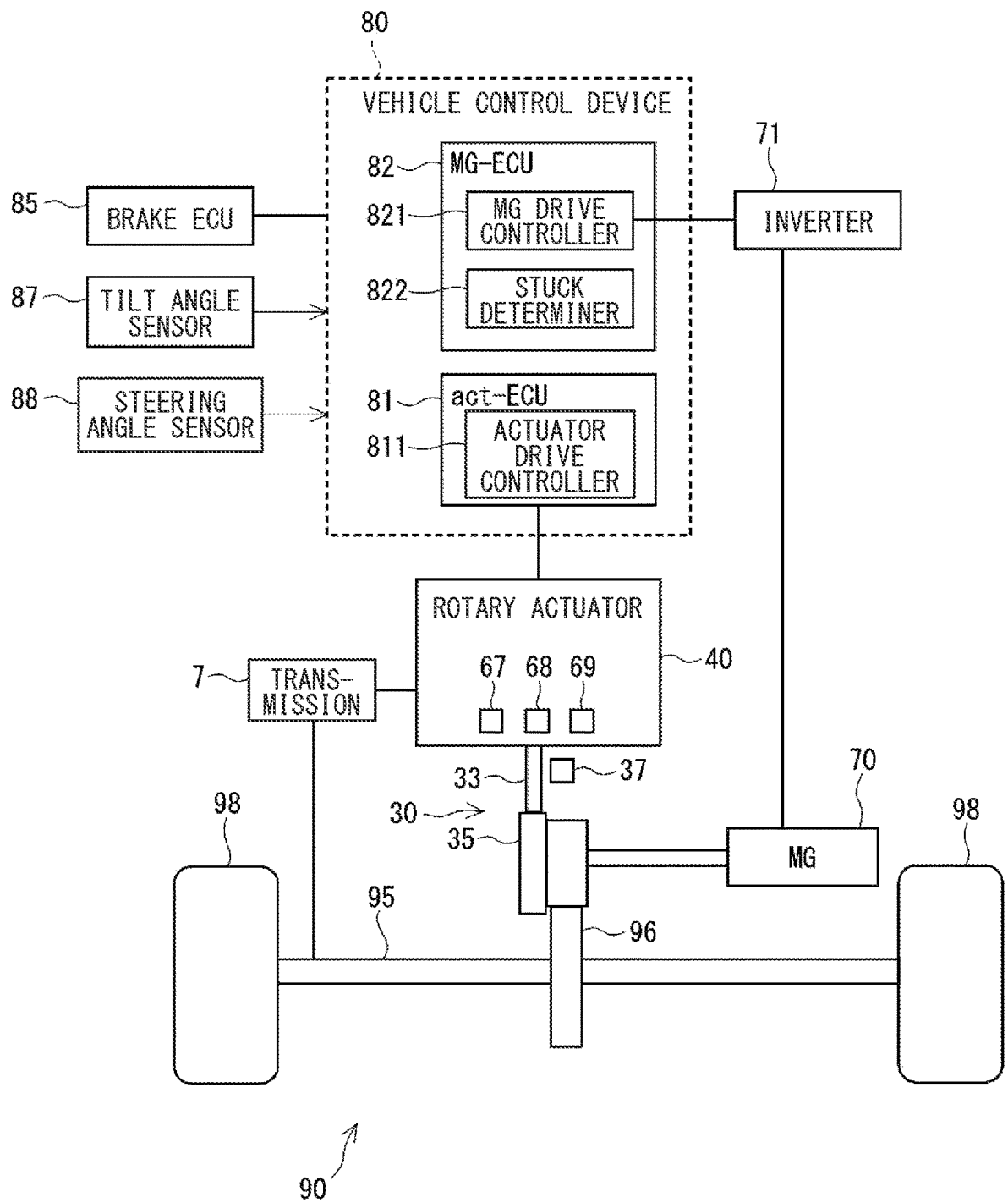
FIG. 1 is a schematic configuration diagram of a vehicle drive system according to a first embodiment.

An electronic control device is known that controls the operation of a parking lock mechanism via an actuator to switch a shift position of an automatic transmission. For example, in the electronic control device, when a parking lock mechanism cannot be released by an output torque of an actuator, a motor generator, which is a source of drive power, outputs a drive torque capable of releasing the parking lock mechanism.

In the electronic control device, it is determined whether or not a shift position has been released from a P range based on an electric signal output by a shift position sensor, and, when not yet released, a cancel torque is output to the parking lock mechanism by controlling an electric motor MG which serves as a source of drive power. In this control device, it is determined whether or not the shift position has been released from the P range based on the determination value of the range sensor, and a cancel torque output control of the electric motor MG is started based on the determination result. However, in this case, there is a possibility that the release from the P range is delayed.

It is an object of the present disclosure to provide a vehicle control device capable of appropriately releasing a parking lock.

A vehicle control device according to an exemplar of the present disclosure controls a vehicle drive system. The vehicle drive system includes a main motor, a parking lock mechanism, and an actuator. The main motor is a source of drive power for driving a vehicle. The parking lock mechanism has a parking lever that can lock an axle of the vehicle by engaging with a parking gear connected to the axle, and can lock a rotation of the axle by an engagement of the parking gear and the parking lever. The actuator is capable of driving the parking lever.

The vehicle control device includes an actuator drive controller configured to control a drive of the actuator, a main motor drive controller configured to control a drive of the main motor, and a stuck determiner configured to determine a stuck of the actuator based on a detection value of a rotation angle sensor that detects a physical quantity changed in accordance with a drive state of the actuator.

The main motor drive controller may be configured to drive the main motor and to perform an engaging surface pressure reduction control in which an engaging surface pressure between the parking gear and the parking lever is reduced, when the struck determiner determines that the actuator is stuck in releasing a parking lock, and the rotation angle sensor is configured to detect a rotation angle of the actuator. For example, the stuck determiner may be configured to set a shift determination threshold value according to a P range release position at which a P range is switched to a not P range, to perform a stuck determination in a range until the detection value of the rotation angle sensor reaches the shift determination threshold value ($\theta$th), and to prevent from performing the stuck determination when the detection value of the rotation angle sensor exceeds the shift determination threshold value.

The stuck determiner may be configured to determine that the actuator is stuck when a state in which the detection value of the rotation angle sensor is not updated in a rotation direction continues at least for a determination time. Alternatively, the stuck determiner may be configured to determine that the actuator is stuck when a drive speed of the actuator continues to be equal to or lower than a speed determination threshold value at least for a determination time.

For example, the determination time for the stuck determination may be variable according to a temperature of the actuator or according to an input voltage to the actuator. When the main motor is driven to perform the engaging surface pressure reduction control, a brake load may be made greater than when the engaging surface pressure reduction control is not performed. The actuator may have a usage environment region in which the parking lock is not releasable when the engaging surface pressure is generated.

The stuck determiner may be configured to determine that the actuator is stuck when the detection value of the rotation angle sensor does not reach a reach determination value for a determination time. For example, the vehicle drive system further includes a detent mechanism having: a detent member with a plurality of valley portions formed therein and being connected to the parking lever; an engaging member movable across the valley portions by the drive of the actuator; and a biasing member biasing the engaging member in a direction to fit into the valley portion. In this case, the reach determination value is a value indicative of a position between (i) a peak position at which the engaging surface pressure due to a load applied to the axle peaks, and (ii) a position from which the engaging member is movable by the biasing force of the biasing member into the valley portion corresponding to the notP range, which is a range other than the P range. The reach determination value may be set as a value indicative of a position between (i) a peak position at which the engaging surface pressure due to a load applied to the axle peaks, and (ii) a position at which the P range is released.

According to another exemplar of the present disclosure, a vehicle control device configured to control a vehicle drive system includes: a rotation angle sensor configured to detect a rotation angle of an actuator driving a parking lever of a vehicle; a controller configured to control a drive of the actuator and to control a drive of a main motor driving the vehicle; and a stuck determiner configured to determine a stuck of the actuator based on a detection value of the rotation angle sensor. In this case, the controller may be configured to drive the main motor and to perform an engaging surface pressure reduction control in which an engaging surface pressure between a parking gear and a parking lever of the vehicle is reduced, when the struck determiner determines that the actuator is stuck in releasing a parking lock, and the controller may be configured to set a shift determination threshold value according to a P range release position at which a P range is switched to a notP range. Furthermore, the stuck determiner may be configured to perform a stuck determination in a range until the detection value of the rotation angle sensor reaches the shift determination threshold value, and to prevent from performing the stuck determination when the detection value of the rotation angle sensor exceeds the shift determination threshold value.

For example, in the engaging surface pressure reduction control, the controller may be configured to make a brake load greater than that when the engaging surface pressure reduction control is not performed.

A vehicle control device will be described below with reference to the drawings. In the following plural embodiments, substantially same structural configurations are designated with the same reference numerals thereby to simplify the description.

First Embodiment

The first embodiment is shown in FIGS. 1 to 12. As shown in FIG. 1, a vehicle drive system 90 includes a main motor 70, an inverter 71, a parking lock mechanism 30, an actuator 40, a vehicle control device 80, and the like, and is mounted on a vehicle 100 (see FIG. 6). The main motor 70 is indicated as "MG" as appropriate.

The main motor 70 functions as an electric motor that generates torque by being rotated with a supply of electric power from a battery (not shown) via the inverter 71, and functions as a generator that is driven and generates electric power when the vehicle 100 is braking, which may also be called as a motor generator. The driving force generated by the main motor 70 rotates wheels 98 via a reduction gear 96 and an axle 95. FIG. 1 shows an example of an electric vehicle in which the source of drive power of the vehicle 100 is the main motor 70, but the vehicle 100 may be a hybrid vehicle that also has an engine (not shown) as the source of drive power. Note that a detent mechanism 20 is omitted in FIG. 1.

Figure 2:
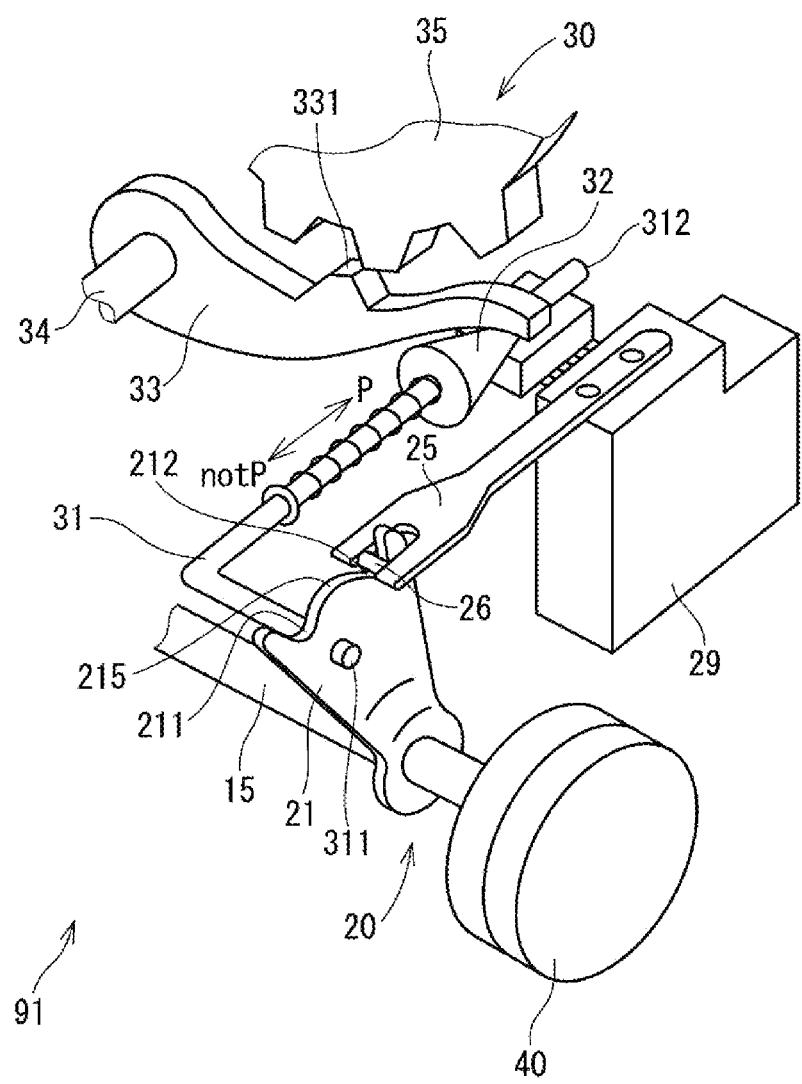
FIG. 2 is a perspective view of a detent switching mechanism and a parking lock mechanism according to the first embodiment.

As shown in FIG. 2, a shift-by-wire system 91 includes the actuator 40, the detent mechanism 20, the parking lock mechanism 30, and the like. The actuator 40 is of a rotary type, and includes a motor 50 and a power transmission portion 510 (see FIG. 3, etc.).

The motor 50 is a DC motor with brushes, and rotates when electric power is supplied from a battery (not shown) through a drive circuit such as an H bridge circuit, and functions as a source of drive power for the detent mechanism 20. The detent mechanism 20 has a detent plate 21, a detent spring 25 and the like, and transmits rotational driving force output from the motor 50 to the parking lock mechanism 30.

The detent plate 21 is fixed to an output shaft 15 and is driven by the motor 50. The detent plate 21 is provided with two valley portions 211 and 212 and a peak portion 215 separating the two valley portions 211 and 212, on a side of the detent spring 25.

The detent spring 25 is an elastically deformable plate-like member, and is provided with a detent roller 26 at a tip of the detent spring 25. The detent spring 25 biases the detent roller 26 toward a rotation center of the detent plate 21. The positions where the detent roller 26 sits by a spring force of the detent spring 25 in a no-load state are bottommost portions of the valleys 211 and 212.

When a rotational force equal to or greater than a predetermined force is applied to the detent plate 21, the detent spring 25 is elastically deformed, and the detent roller 26 moves between the valley portions 211 and 212. By fitting the detent roller 26 into one of the valley portions 211 and 212, the swinging of the detent plate 21 is restricted, the state of the parking lock mechanism 30 is determined, and a shift position is fixed.

The parking lock mechanism 30 includes a parking rod 31, a conical member 32, a parking lever 33, a shaft part 34 and a parking gear 35. The parking rod 31 is formed in a substantially L-shape. The parking rod 31 is fixed to the detent plate 21 on a one end 311 side. The conical member 32 is provided to an other end 312 side of the parking rod 31. The conical member 32 is formed to has a reduced diameter toward the other end 312. When the detent plate 21 rotates in one direction in which the detent roller 26 fits into the valley portion 211 corresponding to a P range, the conical member 32 moves in a direction of an arrow P.

The parking lever 33 comes into contact with a conical surface of the conical member 32, and is provided to be swingable around the shaft part 34. On a parking gear 35 side of the parking lever 33, a protrusion 331 that can engage with the parking gear 35 is provided. When the conical member 32 moves in the direction of the arrow P due to the rotation of the detent plate 21, the parking lever 33 is pushed up and the protrusion 331 and the parking gear 35 engage with each other. On the other hand, when the conical member 32 moves in the direction of the arrow notP, the engagement between the protrusion 331 and the parking gear 35 is released.

The parking gear 35 is connected to the axle 95 via the reduction gear 96 (see FIG. 1), and is provided to be able to engage with the protrusion 331 of the parking lever 33. When the parking gear 35 and the protrusion 331 are engaged with each other, the rotation of the axle 95 is restricted. When the shift position is a notP range, which is a range other than P, the parking gear 35 is not locked by the parking lever 33 and the rotation of the axle 95 is not restricted by the parking lock mechanism 30. In contrast, when the shift position is in the P range, the parking gear 35 is locked by the parking lever 33 and the rotation of the axle 95 is restricted.

Figure 3:
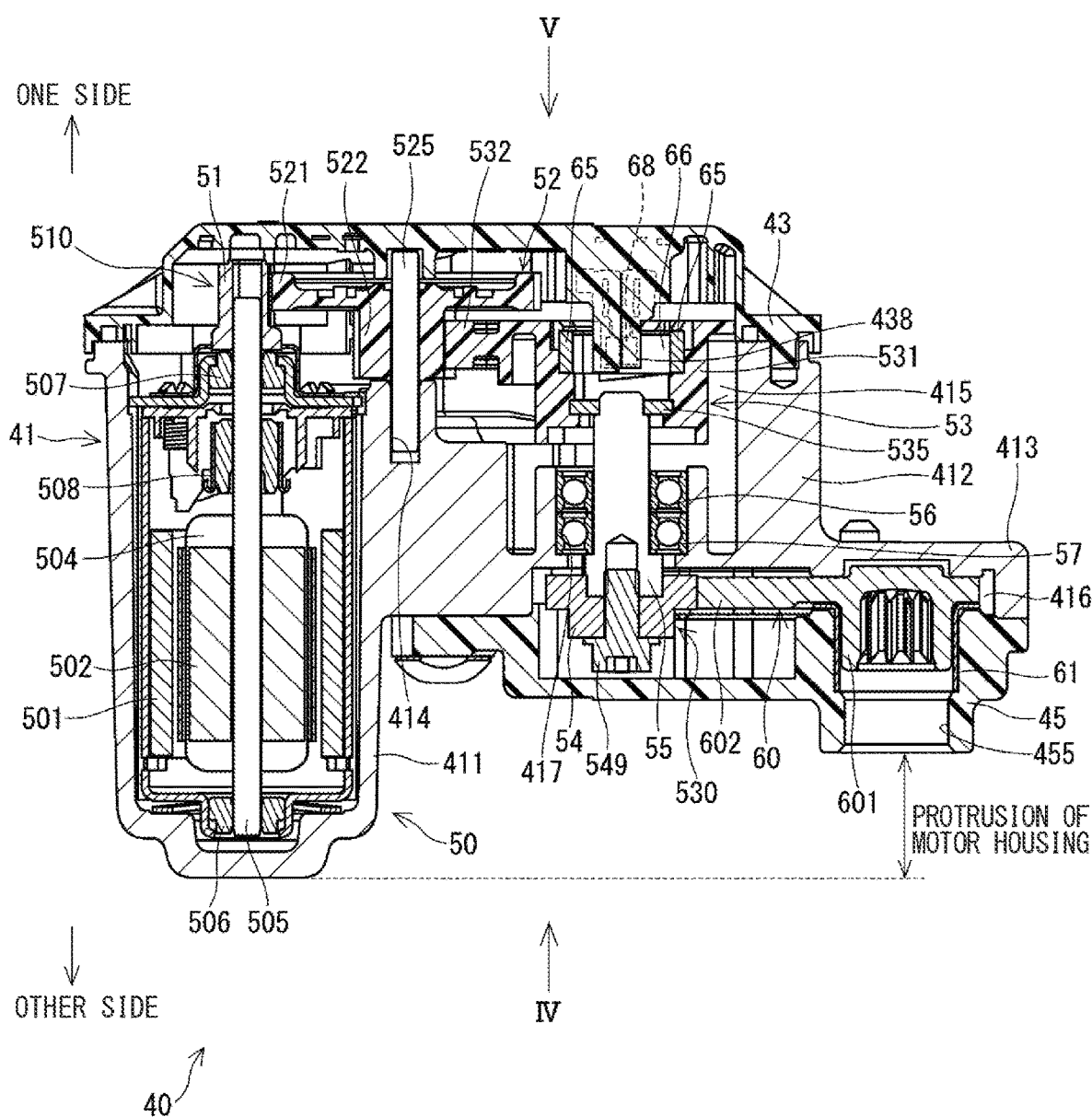
FIG. 3 is a cross-sectional view of an actuator according to the first embodiment.
Figure 4:
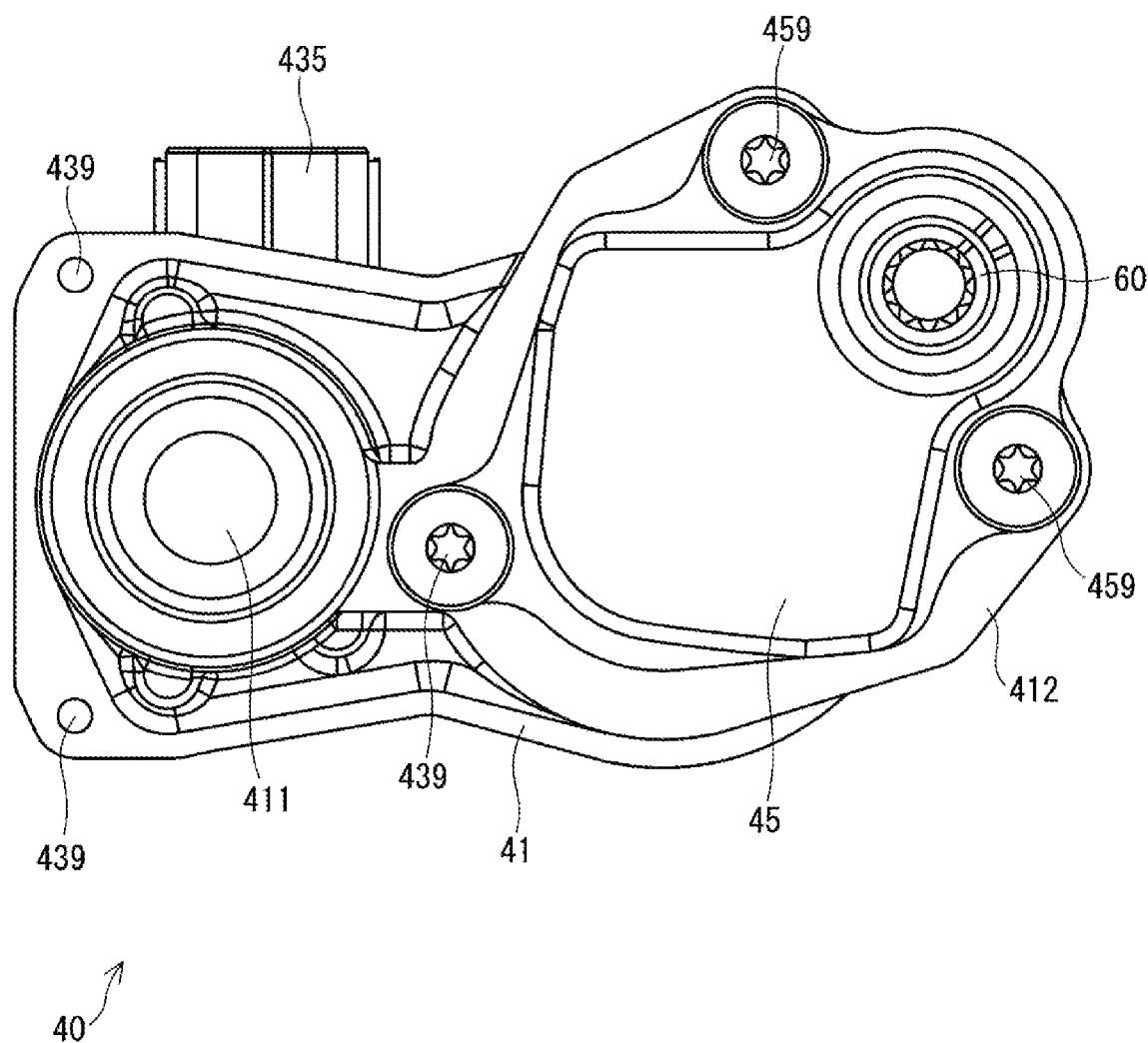
FIG. 4 is a view in a direction of an arrow IV in FIG. 3.
Figure 5:
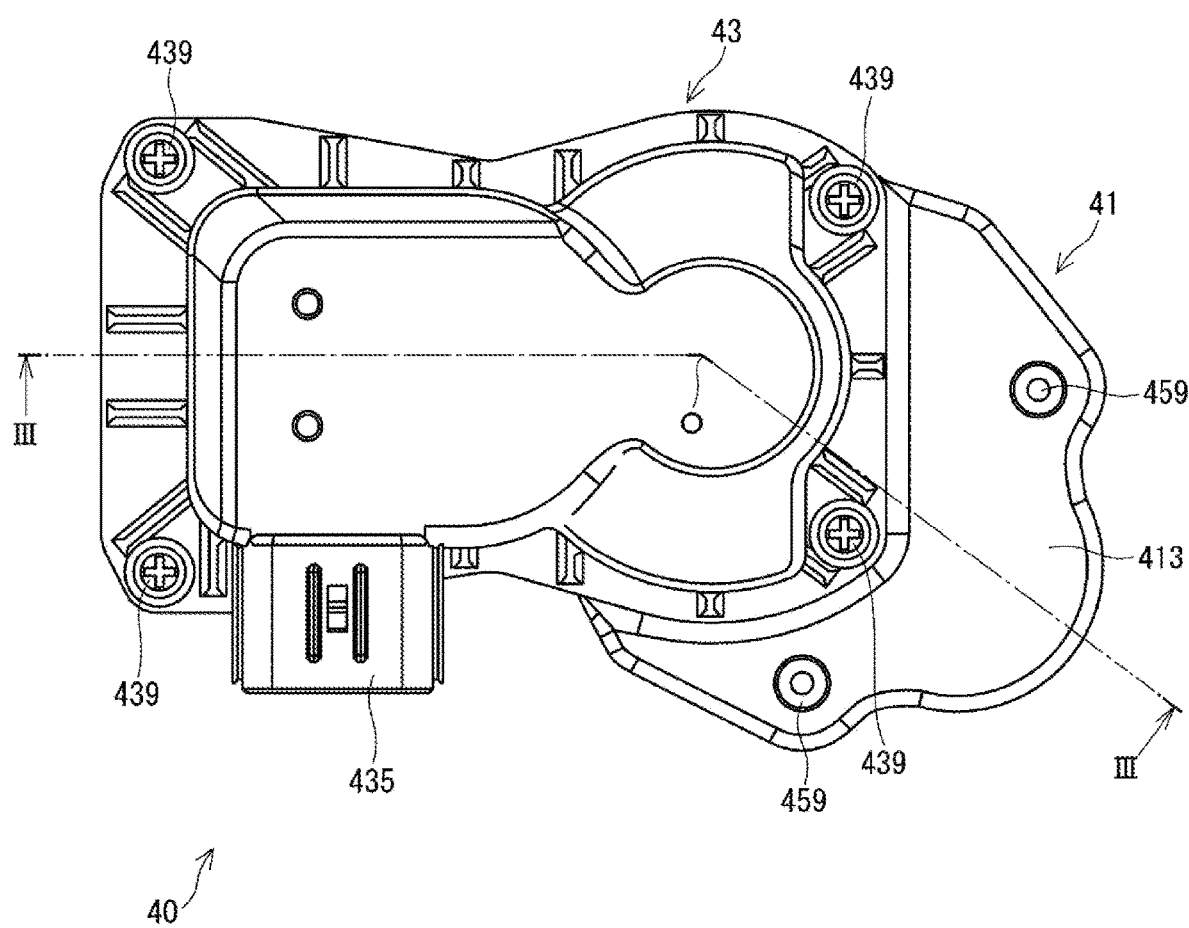
FIG. 5 is a view in a direction of an arrow V in FIG. 3.

The actuator 40 is shown in FIGS. 3 to 5. FIG. 3 is a cross-sectional view taken along a line III-III of FIG. 5. In FIG. 3, an axial direction of the motor 50 is defined as an up-down direction of a surface of the paper, the upper side of the surface of the paper is defined as "one side," and the lower side of the surface of the paper is defined as the "other side."

A housing 41 is made of metal such as aluminum, and is made of a motor housing portion 411 and a gear housing portion 412. The motor housing portion 411 has a substantially-bottomed cylindrical shape that is open on one side in the axial direction. The gear housing portion 412 is formed to protrude radially outward from the motor housing portion 411. One end face of the gear housing portion 412 is formed substantially flush with one end face of the motor housing portion 411. The other end face of the gear housing portion 412 is located in a middle position along an axis of the motor housing portion 411. In other words, the motor housing portion 411 protrudes toward the other side. An output shaft gear housing portion 413 for housing an output shaft gear 60 is formed in the gear housing portion 412, which protrudes in an opposite direction to the motor housing portion 411.

A sensor cover 43 and a gear cover 45 are provided on both sides of the housing 41. The sensor cover 43 is provided on one side of the motor housing portion 411 and the gear housing portion 412, and is fixed to housing 41 with screws 439. A connector 435 is provided on the sensor cover 43, and electric power is supplied to the actuator 40 via the connector 435. It also transmits and receives signals to and from the outside via the connector 435. The gear cover 45 is provided on the other side of the gear housing portion 412, and is fixed to the housing 41 with screws 459.

The motor 50 has a magnet 501, a core 502, a coil 504, a motor shaft 505, a commutator 508, brushes (not shown) and the like. The magnet 501 is fixed to an inner peripheral side of the motor housing portion 411. The core 502 is provided inside the magnet 501 in the radial direction, and generates a rotational force when electric current flows through the coil 504 wound around the core 502. The motor shaft 505 is rotatably supported by bearings 506 and 507, and rotates together with the core 502. The commutator 508 causes electric current supplied from the brush to flow through the coil 504.

A power transmission portion 510 is provided at a position between the motor shaft 505 and the output shaft 15, and transmits the driving force of the motor 50 to the output shaft 15. The power transmission portion 510 has gears 51 to 54 and 60. The gears 51 to 54 and 60 are all spur gears.

The motor gear 51 and the gears 52 and 53 are arranged in a first gear chamber 415 that opens to one side of the housing 41. The gear 54 and the output shaft gear 60 are arranged in a second gear chamber 416 that opens to the other side of the housing 41. The first gear chamber 415 and the second gear chamber 416 communicate with each other through a shaft hole 417 through which a gear connection shaft 55 is inserted. In the present embodiment, the motor gear 51, the gear 54 and the output shaft gear 60 are made of metal, and the gears 52 and 53 are made of resin.

The motor gear 51 is fixed to one side of the motor shaft 505, and rotates together with the motor shaft 505. The gear 52 has a large diameter portion 521 and a small diameter portion 522 and rotates together with shaft 525. A spur tooth is formed on a radially outer side of the large diameter portion 521, and engages with the motor gear 51. A spur tooth is formed on a radially outer side of the small diameter portion 52,2 and engages with the gear 53. The shaft 525 is inserted into an axial hole 414 formed in the housing 41, and is rotatably supported.

The gear 53 has a cylinder portion 531 and a gear portion 532. The gear portion 532 is formed to protrude radially outward from the cylinder portion 531. The gear portion 532 is formed with spur teeth that engage with the small diameter portion 522 of the gear 52. The gear portion 532 is formed within a range in which a position sensor 68 can detect an absolute angle (for example, less than 180 degrees). A shaft fixing member 535 is provided radially inside the cylinder portion 531. The shaft fixing member 535 is made of metal, for example.

The gear connection shaft 55 is rotatably supported in the housing 41 by bearings 56 and 57. In the present embodiment, the bearings 56 and 57 are ball bearings, and are press-fitted into the shaft hole 417. By providing a plurality of bearings, tilting of the gear connection shaft 55 can be suppressed. In addition, since rattling in the radial direction of the gear connection shaft 55 can be suppressed, it is possible to reduce the occurrence of wear due to hitting of the shaft.

One side of the gear connection shaft 55 is press-fitted into the shaft fixing member 535 provided radially inside the cylinder portion 531 of the gear 53 and is fixed by, for example, rolling caulking. Thereby, the gear 53 is fixed to one side of the gear connection shaft 55. The gear 54 is fixed to the other side of the gear connection shaft 55 with a bolt 549. As a result, the cylinder portion 351 of the gear 53 and the gear 54 are coaxially connected by the gear connection shaft 55, and rotate together. In the present embodiment, the gear 53 and the gear 54 constitute a connection gear 530. The gear 54 is formed to have substantially the same diameter as the cylinder portion 531, and has spur teeth that engage with the output shaft gear 60 on the entire outer periphery in the radial direction.

The output shaft gear 60 has an output shaft connection portion 601 and a gear portion 602 formed in a substantially cylindrical shape. The output shaft connection portion 601 is rotatably supported on the gear cover 45 by a bush 61 provided radially outward. The output shaft 15 (see FIG. 1) is press-fitted inside the output shaft connection portion 601 in the radial direction, and rotates integrally. A bushing 61 is press-fitted into an output shaft holding portion 455 of the gear cover 45.

The gear portion 602 is formed to protrude radially outward of the output shaft connection portion 601, and engages with the gear 54. In the present embodiment, an engaging portion between the motor gear 51 and the large diameter portion 521 of the gear 52 is a first speed reduction stage, and an engaging portion between the small diameter portion 522 of the gear 52 and the gear portion 532 of the gear 53 is a second speed reduction stage, and an engaging portion between the gear 54 and the gear portion 602 of the output shaft gear 60 is a third speed reduction stage. That is, in the present embodiment, the number of speed reduction stages is three, and the third speed reduction stage is the final speed reduction stage.

The gears 52, 53 and the like are assembled from one side of the housing 41, and the gear 54 and the output shaft gear 60 and the like are assembled from the other side of the housing 41. By changing the length of the gear connection shaft 55 that connects the gear 53 and the gear 54, a protruding margin of the motor housing portion 411 can be adjusted in accordance with mating parts assembled via the actuator 40 and the output shaft 15. As a result, the degree of freedom in mounting can be improved.

Sensor magnets 65 are provided radially inside the cylinder portion 531 of the gear 53 and closer to the sensor cover 43 than the shaft fixing member 535. The sensor magnets 65 are respectively formed in a narrow plate shape, for example, and are provided on opposite sides of the gear 53 with the rotating shaft interposed therebetween. In other words, the sensor magnets 65 are provided 180 degrees apart. The sensor magnets 65 are held by a magnet holding member 66 formed in an annular shape. The magnet holding member 66 is fixed to the cylinder portion 531 by press-fitting or the like.

The position sensor 68 is held by a sensor holding portion 438 that protrudes from the sensor cover 43. The position sensor 68 has a Hall IC that detects changes in the magnetic field due to the rotation of the sensor magnets 65, and is provided so that a sensor element is positioned at the center of the two sensor magnets 65. In the present embodiment, since a reduction ratio of the final speed reduction stage is 6 or less and the rotation range of the gear 53 is less than 180 degrees, the position sensor 68 can detect the rotation position of the gear 53 as an absolute angle. Further, the absolute angle of the output shaft 15 can be calculated by gear ratio conversion. The position sensor 68 may be a linear sensor, an encoder, a resolver, or the like, and may detect a rotational position other than the gear 53.

The gear 53 provided with the sensor magnet 65 constitutes a speed reduction stage one step before the final speed reduction stage. Therefore, the transmission torque is smaller than that of the output shaft gear 60, making the eccentric force generated by variations in the shape of the gear tooth surface, vibration and the like smaller, thereby suppressing accuracy deterioration compared with a case where an angle of the output shaft gear 60 is detected. Further, as shown in FIG. 1, the actuator 40 is provided with a current sensor 67 that detects electric current of the motor 50 and a temperature sensor 69 that detects temperature thereof.

The vehicle control device 80 has an actuator control unit (hereinafter "act-ECU") 81 and an MG control unit (hereinafter "MG-ECU") 82. The act-ECU 81 and the MG-ECU 82 are mainly made of a microcomputer, etc., and are provided with a CPU, ROM, RAM, I/O (not shown), bus lines connecting these components, and the like. Processing in the ECU may be a software process by executing a program pre-stored in a substantial memory device such as a ROM (that is, a readable non-temporary tangible recording medium) by the CPU, or may be a hardware process executed by a dedicated electronic circuit.

The vehicle control device 80 acquires detection values of a range sensor 37, the position sensor 68, the temperature sensor 69, a tilt angle sensor 87, and a steering angle sensor 88, and can use these detection values for various controls. Further, an oil temperature of a transmission 7 connected to the detent mechanism 20 (hereinafter referred to as "TM oil temperature") or the like may be used for an energization control of the coil 504. The transmission 7 may also be a transaxle or the like. Further, the vehicle control device 80 is provided to be capable of transmitting and receiving various information to and from a brake ECU 85.

The range sensor 37 is provided outside the actuator 40 and near the parking lever 33, and is a sensor that determines whether a shift position has switched from one of the P range or the notP range to the other one of the P range or the notP range. The position sensor 68 is provided inside the actuator 40, and can continuously detect the rotation of a rotating body.

The act-ECU 81 has an actuator drive controller 811 and the like as functional blocks, and controls the energization of the motor 50 based on the shift position requested by the driver, the signal from the brake switch, the vehicle speed, and the like, so as to control an operation of the parking lever 33.

The MG-ECU 82 has, as functional blocks, an MG drive controller 821, a stuck determiner 822, and the like. The MG drive controller 821 controls the drive of the main motor 70 by controlling an ON/OFF operation of the switching elements forming the inverter 71. The stuck determiner 822 determines stuck of the actuator 40 based on a detection value θsns of the position sensor 68.

In the present embodiment, the act-ECU 81 and the MG-ECU 82 are provided separately, but they may be configured as a single ECU. Also, the act-ECU 81 may be provided integrally with the actuator 40. Further, for example, the stuck determiner 822 may be provided on the act-ECU 81, which means that various determination processes described later may be performed either by the act-ECU 81 or the MG-ECU 82.

Figure 6:
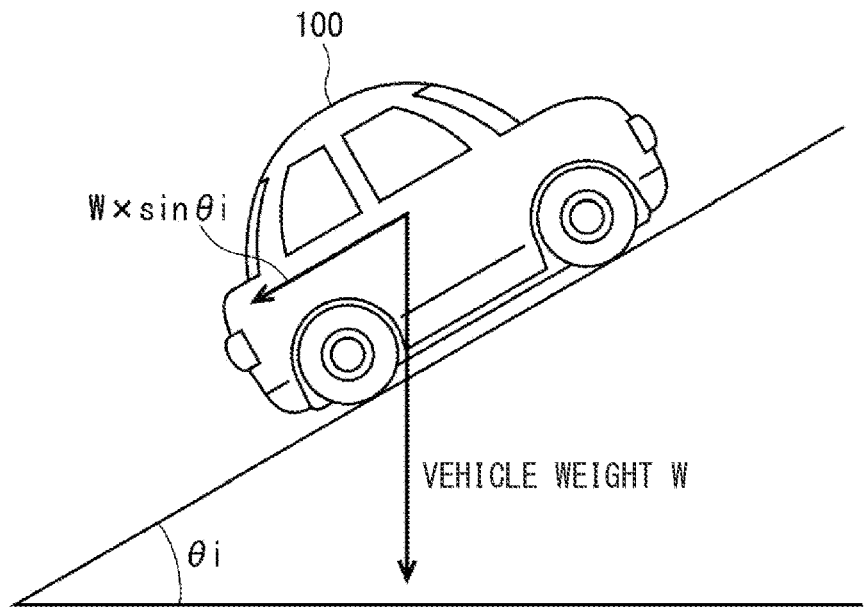
FIG. 6 is a diagram for explaining a state in which a vehicle is tilted.
Figure 7:
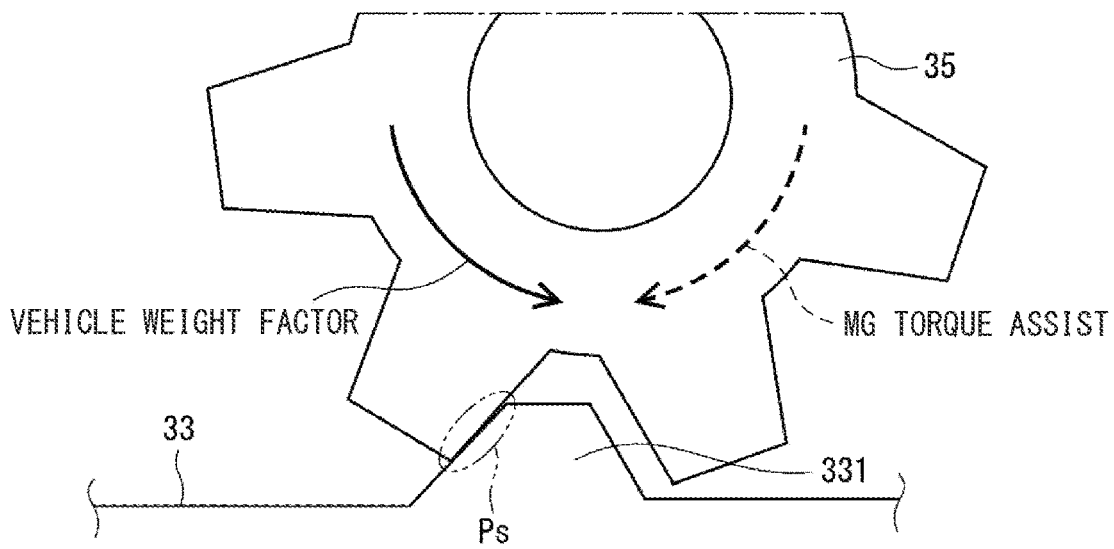
FIG. 7 is a schematic diagram of an engaging surface pressure in the parking lock mechanism.

As described above, the parking lock is releasable by driving the motor 50. As shown in FIG. 6, when the vehicle 100 is stopped in a tilted state, a load L (see an equation (1)) corresponding to a vehicle weight W and a tilt angle θi is applied to the vehicle 100 in a longitudinal direction. As shown in FIG. 7, the load L corresponding to the vehicle weight W and tilt angle θi is applied to a surface pressure generated portion Ps where the parking lever 33 and the parking gear 35 engage.

$$L = W \times \sin \theta i \qquad (1)$$

Therefore, when pulling out the parking lever 33 from the parking gear 35 in a state in which the vehicle 100 is in a tilted state, a larger torque is required due to an engaging load than a state in which the vehicle is on a level road. Hereinafter, pulling out the protrusion 331 of the parking lever 33 from the parking gear 35 is referred to as "out-of P-range."

Figure 8:
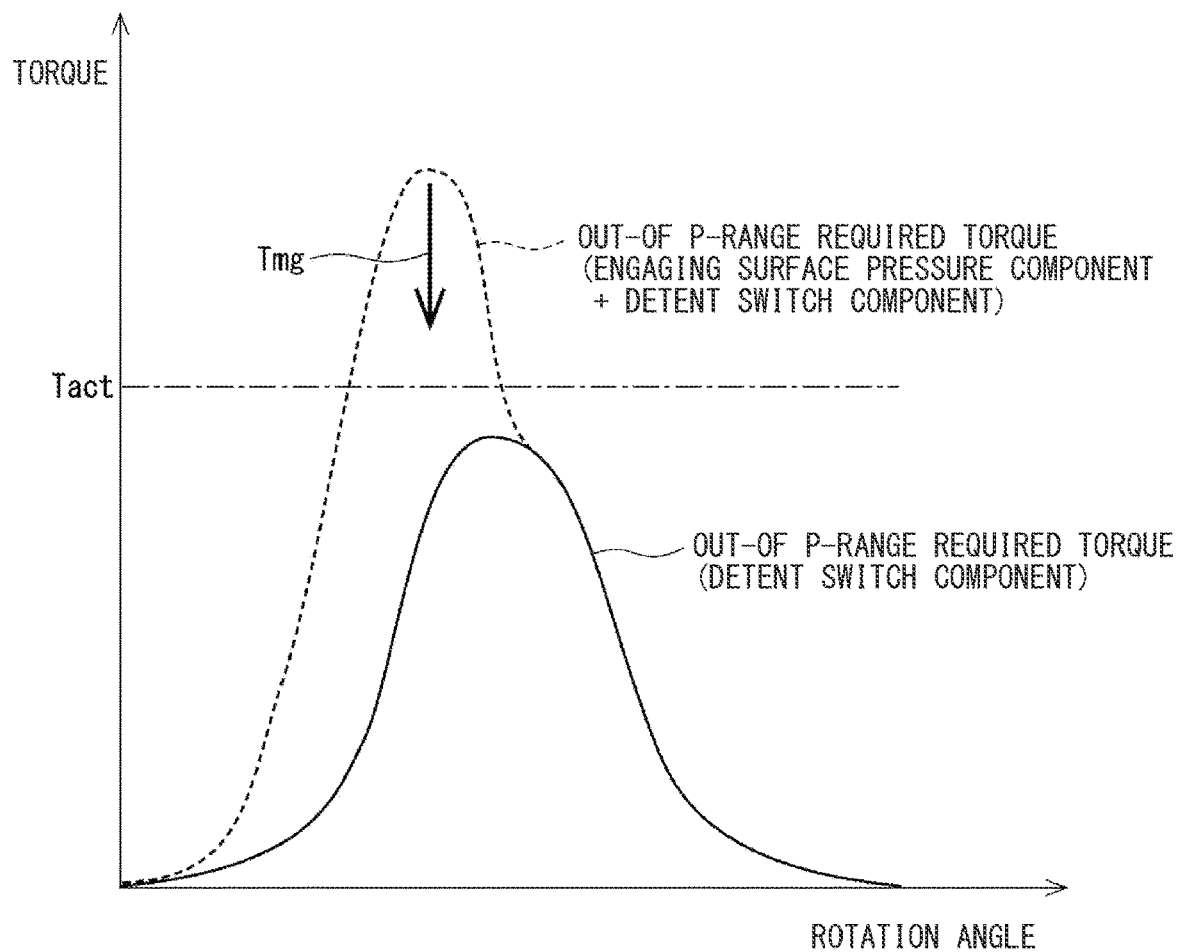
FIG. 8 is a diagram for explaining a torque required for shifting-out P-range (i.e., out-of P-range required torque)

FIG. 8 is a diagram, in which the horizontal axis represents a rotation angle of the actuator 40, and the vertical axis represents a torque of the actuator 40. As shown in FIG. 8, when performing out-of P-range in a state where an engaging surface pressure is applied, in addition to a torque for switching a detent of the detent mechanism 20 shown by a solid line of FIG. 8, a torque of an engaging surface pressure component shown by a broken line of FIG. 8 is required. Therefore, when the torque that can be output by the actuator 40 is relatively small, for example, as indicated by a one-dot chain line of FIG. 8, there is a possibility that an output torque Tact of the actuator 40 alone may be not enough to perform out-of P-range. Further, when the torque of the engaging surface pressure component is covered by the actuator 40, the physical size of the actuator 40 is increased.

Figure 9:
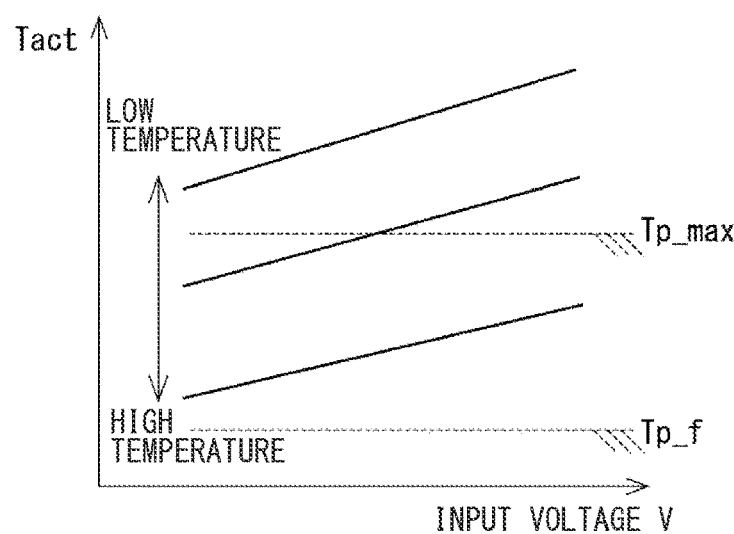
FIG. 9 is a diagram for explaining an output torque of the actuator according to the first embodiment.
Figure 10:
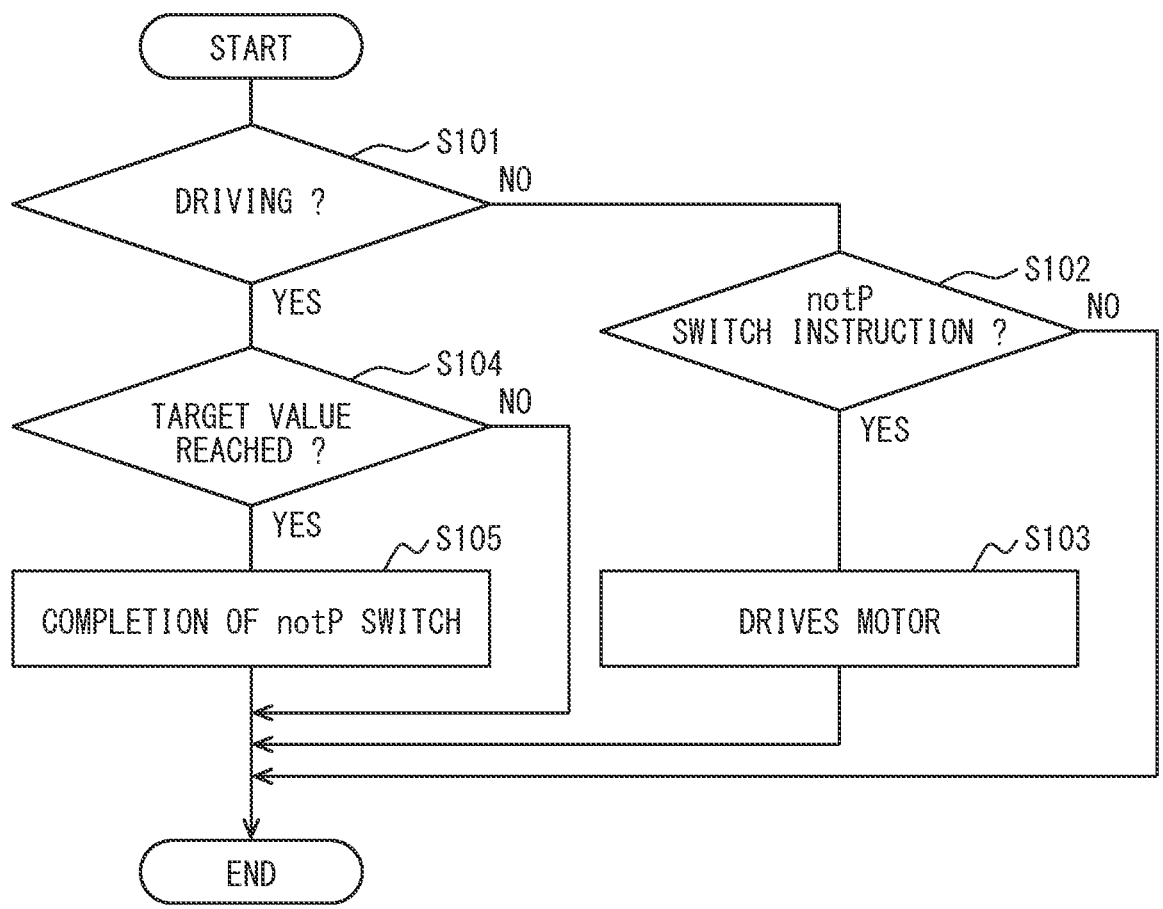
FIG. 10 is a flowchart of an actuator control process according to the first embodiment.

FIG. 9 is a diagram, in which the horizontal axis represents an input voltage V of the actuator 40, and the vertical axis represents the output torque Tact of the actuator 40. In FIG. 9, Tp_f is a torque required to perform out-of P-range on the level road, and Tp_max is a torque required to perform out-of P-range on an assumable maximum slope. When the temperature of is high and/or the voltage is low, the output torque Tact of the actuator 40 decreases. Thereby, depending on the tilting state of the vehicle, temperature conditions, and the input voltage V or the like, there may be a region where out-of P-range cannot be performable only by the torque of the motor 50.

Therefore, in the present embodiment, the main motor 70 is driven as required when performing out-of P-range to generate a torque that cancels the torque of the engaging surface pressure component. As a result, the engaging surface pressure component due to the vehicle weight can be reduced by an MG torque Tmg, thereby lowering a required torque compared to a case where out-of P-range is performed only by the motor 50, and size reduction of the motor 50 is achievable. In addition, the amount of energization and heat load of a drive circuit (not shown) for driving the motor 50 can be reduced.

In the present embodiment, the drive of the motor 50 and the drive of the main motor 70 are controlled based on the detection value θsns of the position sensor 68. An actuator control process is described based on a flowchart of FIG. 10. This process is performed at a predetermined cycle by the actuator drive controller 811 when the shift position is in the P range. Hereinafter, "step" in step S101 is omitted, and is simply designated as a symbol "S."

In S101, the actuator drive controller 811 determines whether the motor 50 is in driving. If it is determined that the motor 50 is in driving (S101: YES), the process proceeds to S104. If it is determined that the motor 50 is not in driving (S101: NO), the process proceeds to S102.

In S102, the actuator drive controller 811 determines whether or not there is a notP switch instruction. Here, the determination is made based on the switch instruction from the MG-ECU 82, but the determination may be made internally based on a shift signal or the like. If it is determined that there is no notP switch instruction (S102: NO), the process of S103 is skipped. If it is determined that there is a notP switch instruction (S102: YES), the process proceeds to S103.

In S103, the actuator drive controller 811 sets a target value θ* that allows switching from the P range to the notP range, and drives the motor 50 so that the detection value θsns of the position sensor 68 becomes the target value θ*.

In S104 at which the process proceeds when it is determined that the motor 50 is in driving (S101: YES), the actuator drive controller 811 determines whether or not the detection value θsns of the position sensor 68 has reached the target value θ*. If it is determined that the detection value θsns has not reached the target value θ* (S104: NO), drive control of the motor 50 is continued. When it is determined that the detection value θsns has reached the target value θ* (S104: YES), the process proceeds to S105, determines that switching to the notP range is complete, and stops the motor 50. In addition, the act-ECU 81 transmits, to the MG-ECU 82, information indicating that the switching is complete.

Figure 11:
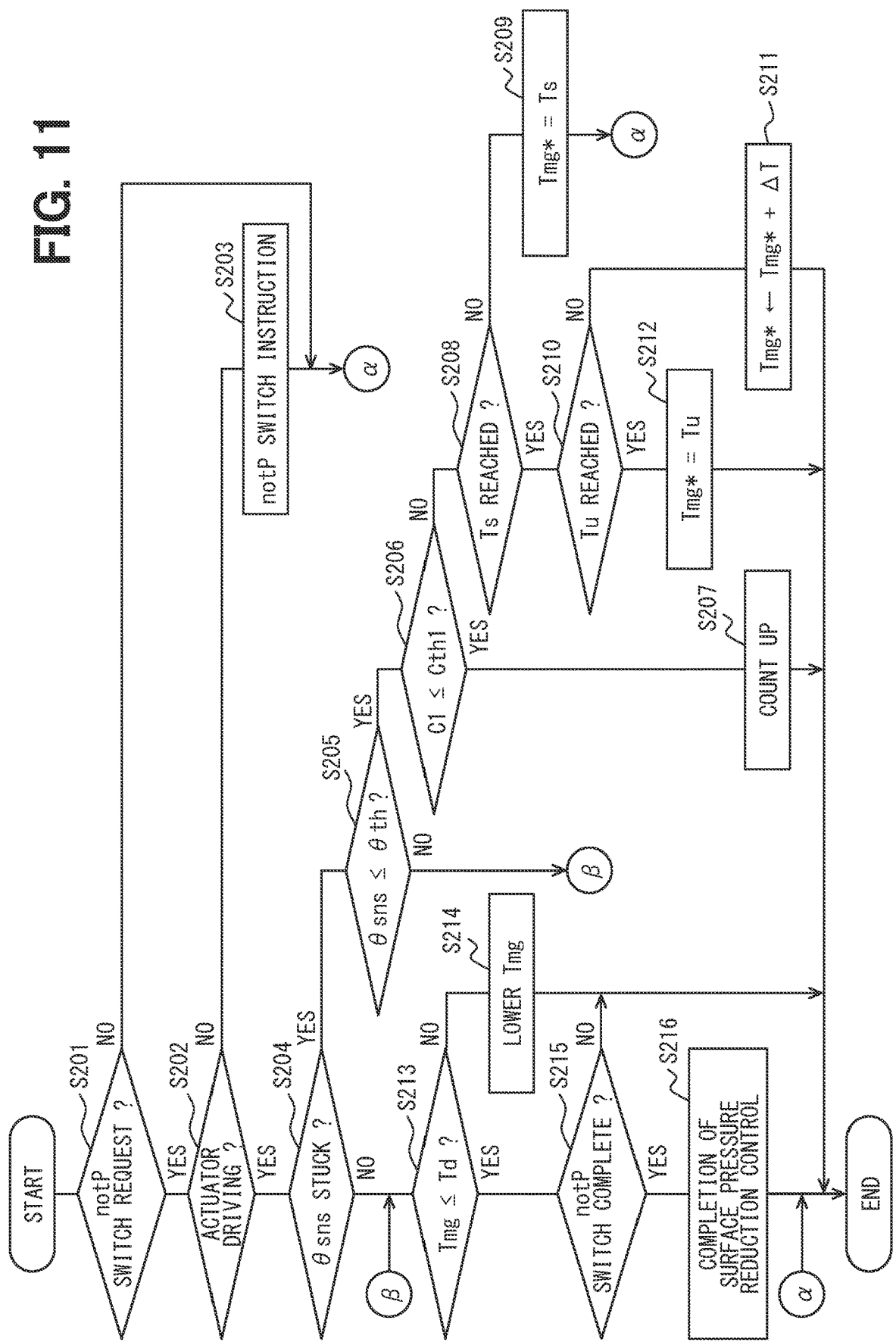
FIG. 11 is a flowchart of an MG control process according to the first embodiment.

An MG control process is described based on a flowchart of FIG. 11. This process is performed at a predetermined cycle by the MG-ECU 82 when the shift position is the P range.

In S201, the MG-ECU 82 determines whether or not there is a notP switch request. If it is determined that there is no notP switch request (S201: NO), the process after S202 is skipped. If it is determined that there is a notP switch request (S201: YES), the process proceeds to S202.

In S202, the MG-ECU 82 determines whether the actuator 40 is in driving. If it is determined that the actuator 40 is not in driving (S202: NO), the process proceeds to S203, and transmits a notP switch instruction to the act-ECU 81. If it is determined that the actuator 40 is in driving (S202: YES), the process proceeds to S204.

In S204, the stuck determiner 822 determines whether or not the detection value θsns of the position sensor 68 is stuck. Here, when the maximum value of the detection value θsns is not updated, it is determined that the detection value θsns is stuck. If it is determined that the detection value θsns is not stuck (S204: NO), the process proceeds to S213. If it is determined that the detection value θsns is stuck (S204: YES), the process proceeds to S205.

In S205, the stuck determiner 822 determines whether or not the detection value θsns is equal to or less than a shift determination threshold value θth. The shift determination threshold value θth is set, for example, according to a P range release position θy at which the range sensor 37 switches from the P range to the notP range. The P range release position θy is on a P range side of a switch completion position where the detent roller 26 fits into the bottom-most portion of the valley portion 212. When it is determined that the detection value θsns is greater than the shift determination threshold value θth (S205: NO), the process proceeds to S213. If the detection value θsns is greater than the shift determination threshold value θth, an engaging surface pressure reduction process is not performed by using the MG torque, since there is a high probability that the shifting control is stuck due to a factor other than the engaging surface pressure (for example, a mechanical lock or the like) or it is a situation that a normal stop control is in progress. If it is determined that the detection value θsns is equal to or less than the shift determination threshold value θth (S205: YES), the process proceeds to S206.

In S206, the stuck determiner 822 determines whether or not a stuck count value C1 is equal to or less than a stuck determination threshold value Cth1 corresponding to a stuck determination time Xth1. If it is determined that the stuck count value C1 is equal to or less than the stuck determination threshold value Cth1 (S206: YES), the process proceeds to S207 to count up the stuck count value C1. If it is determined that the stuck count value C1 is greater than the stuck determination threshold value Cth1 (S206: NO), the process proceeds to S208.

In S208, the MG drive controller 821 determines whether or not the MG torque Tmg has reached an initial torque value Ts. The initial torque value Ts is a value that can reduce the engaging surface pressure, and is set to a value that allows the motor 50 to start moving, for example. Also, the initial torque value Ts may be a learned value. When it is determined that the MG torque Tmg has not reached the initial torque value Ts (S208: NO), the process proceeds to S209 and an MG torque instruction value Tmg* is set as the initial torque value Ts. When it is determined that the MG torque Tmg has reached the initial torque value Ts (S208: YES), the process proceeds to S210.

In S210, the MG drive controller 821 determines whether or not the MG torque Tmg has reached an upper limit torque value Tu. The upper limit torque value Tu is the maximum torque in the engaging surface pressure reduction control, and is set to a value that allows the engaging surface pressure to be reduced so that the actuator 40 operates reliably. When it is determined that the MG torque Tmg has not reached the upper limit torque value Tu (S210: NO), the process proceeds to S211 to increase the MG torque instruction value Tmg* by a gradual change amount ΔT. If it is determined that the MG torque Tmg has reached the upper limit torque value Tu (S210: YES), the process proceeds to S212, and sets the MG torque instruction value Tmg* as the upper limit torque value Tu.

In S213, the MG drive controller 821 determines whether or not the MG torque Tmg is equal to or less than a travel torque Td. If a set travel torque is 0, then Td is set to 0 (zero) (i.e., Td=0). If it is determined that the MG torque Tmg is greater than the travel torque Td (S213: NO), that is, if an engaging surface pressure reduction torque is being output, the process proceeds to S214 to lower the MG torque Tmg. If it is determined that the MG torque Tmg is equal to or less than the travel torque Td (S213: YES), the process proceeds to S215. When the travel torque Td is not 0 and the MG torque Tmg is smaller than the travel torque Td, the MG torque Tmg is controlled by separate processing.

In S215, the MG-ECU 82 determines whether or not switching to the notP range is complete. If it is determined that the switching to the notP range is not complete (S215: NO), a current state is maintained. If it is determined that the switching to the notP range is complete (S215: YES), the process proceeds to S216, and the surface pressure reduction control during the out-of P-range is complete.

Figure 12:
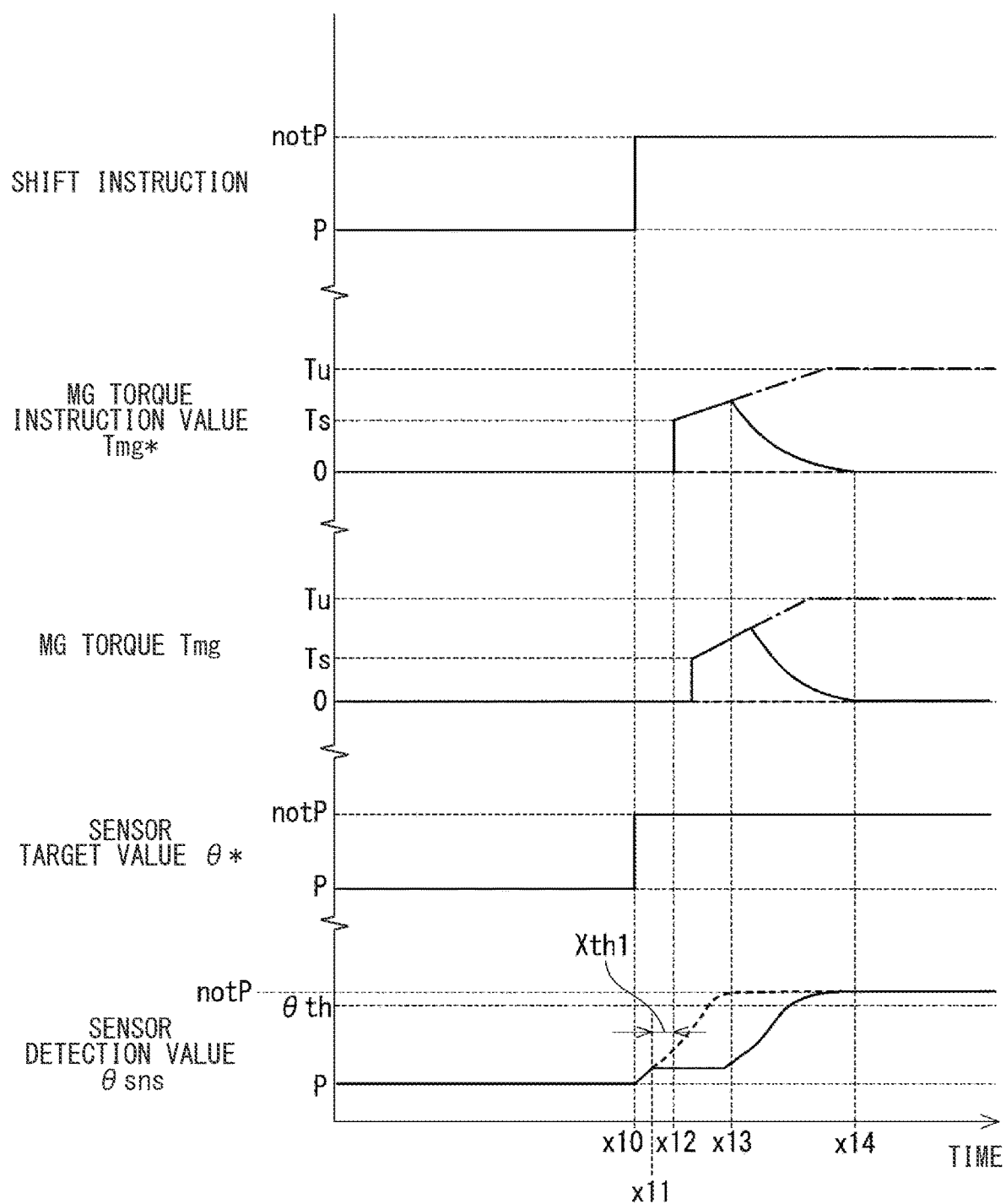
FIG. 12 is a time chart of an out-of P-range control process according to the first embodiment.

The out-of P-range control process is described based on a time chart of FIG. 12. In FIG. 12, the horizontal axis is a common time axis, and, from the top row, a shift instruction, an MG torque instruction value Tmg*, an MG torque Tmg, a target value θ* of the position sensor 68, and a detection value θsns of the position sensor 68 are shown. The values of the position sensor 68 are listed as corresponding ranges where appropriate. Further, the description is made assuming that the travel torque Td=0 during the out-of P-range control process. The same applies to the time charts according to the embodiments described later.

At time x10, when the shift instruction is switched from the P range to the notP range, the drive of the motor 50 is started. When the engaging surface pressure is not generated, the motor 50 is not stuck, and the out-of P-range is complete by the torque of the motor 50, as indicated by a broken line.

When an engaging surface pressure not allowing the out-of P-range by the torque of the motor 50 is being generated, the detection value θsns of the position sensor 68 is stuck at a position where the detection value θsns is smaller than the shift determination threshold value θth at time x11.

At time x12 when the stuck determination time Xth1 has lapsed from time x11, it is determined that the actuator 40 is stuck, and the MG torque instruction value Tmg* is set to the initial torque value Ts, and the main motor 70 is driven. Also, the MG torque instruction value Tmg* is gradually increased. The MG torque Tmg follows the change in the MG torque instruction value Tmg* with a delay, but the details of the follow-up delay is omitted.

At time x13, when the stuck of the actuator 40 is resolved and the maximum value of the detection value θsns of the position sensor 68 is updated, the MG torque instruction value Tmg* is lowered. Note that when the stuck of the actuator 40 is not resolved, the MG torque instruction value Tmg* is increased to the upper limit torque value Tu, as indicated by a one-dot chain line. Alternatively, the initial torque value Ts may be set to 0, and the MG torque Tmg may be gradually increased from a state in which the main motor 70 is stopped. Alternatively, the initial torque value Ts may be set to be equal to the upper limit torque value Tu, and the upper limit torque value Tu may be output from time x12.

At time x14 when the range switching is complete, the MG torque instruction value Tmg* is set to 0. In an example of FIG. 12, the timing of the completion of the range switching and the timing of the MG torque instruction value Tmg* becoming 0 are approximately the same. However, the MG torque instruction value Tmg* may become 0 before the range switching is complete.

In the present embodiment, when the engaging surface pressure is generated in the parking lock mechanism 30 due to tilting of the vehicle or the like, whether to start the engaging surface pressure reduction control by the main motor 70 is determined based on the detection value θsns of the position sensor 68 provided on the actuator 40. As a result, it is possible to quickly determine whether the actuator 40 is stuck, to shorten the time until the start of the surface pressure reduction control by the main motor 70, and to improve the responsiveness. In addition, heat generation of the motor 50 due to stuck and heat generation of elements related to the drive of the motor 50 are suppressible.

As described above, the vehicle control device 80 controls the vehicle drive system 90 including the main motor 70 that is the source of drive power of the vehicle 100, the parking lock mechanism 30 and the actuator 40. The parking lock mechanism 30 has the parking gear 35 connected to the axle 95 and the parking lever 33 that can be engaged with the parking gear 35, and the engagement of the parking gear 35 and the parking lever 33 allows the axle 95 to be locked. The actuator 40 can drive the parking lever 33. In the present embodiment, there is a usage environment region where the parking lock is not releasable only by the actuator 40 when the engaging surface pressure is generated.

The vehicle control device 80 includes the actuator drive controller 811 that controls drive of the actuator 40, the MG drive controller 821 that controls drive of the main motor 70, and the stuck determiner 822. The stuck determiner 822 determines stuck of the actuator 40 based on the detection value of the sensor unit that detects the physical quantity changed in accordance with the drive state of the actuator 40. The sensor unit of the present embodiment is the position sensor 68 configured to detect a rotation angle of the actuator 40.

When it is determined that the actuator 40 is stuck in a state where the parking lock is releasing, the MG drive controller 821 drives the main motor 70 and performs the engaging surface pressure reduction control, so as to reduce the engaging surface pressure between the parking gear 35 and the parking lever 33.

As a result, while the actuator 40 is miniaturized, the out-of P-range is reliably performable. Further, by performing the stuck determination based on the signal that changes according to the drive of the actuator 40, it is possible to shorten the period from the start of driving the actuator 40 to the start of application of the MG torque, thereby improving the responsiveness. In addition, heat generation of the motor 50 and the IC associated with the drive of the motor 50 is suppressed.

The stuck determiner 822 determines that the actuator 40 is stuck when the state in which the detection value of the position sensor 68 is not updated in the rotational direction continues at least for the stuck determination time Xth1. Thereby, the stuck of the actuator 40 can be determined appropriately.

The stuck determiner 822 does not perform the engaging surface pressure reduction control when the detection value of the position sensor 68 exceeds the shift determination threshold value θth. As a result, it is possible to prevent false determination that falsely determines a normal stop control or mechanical lock as the stuck due to engaging surface pressure.

Second Embodiment

Figure 13:
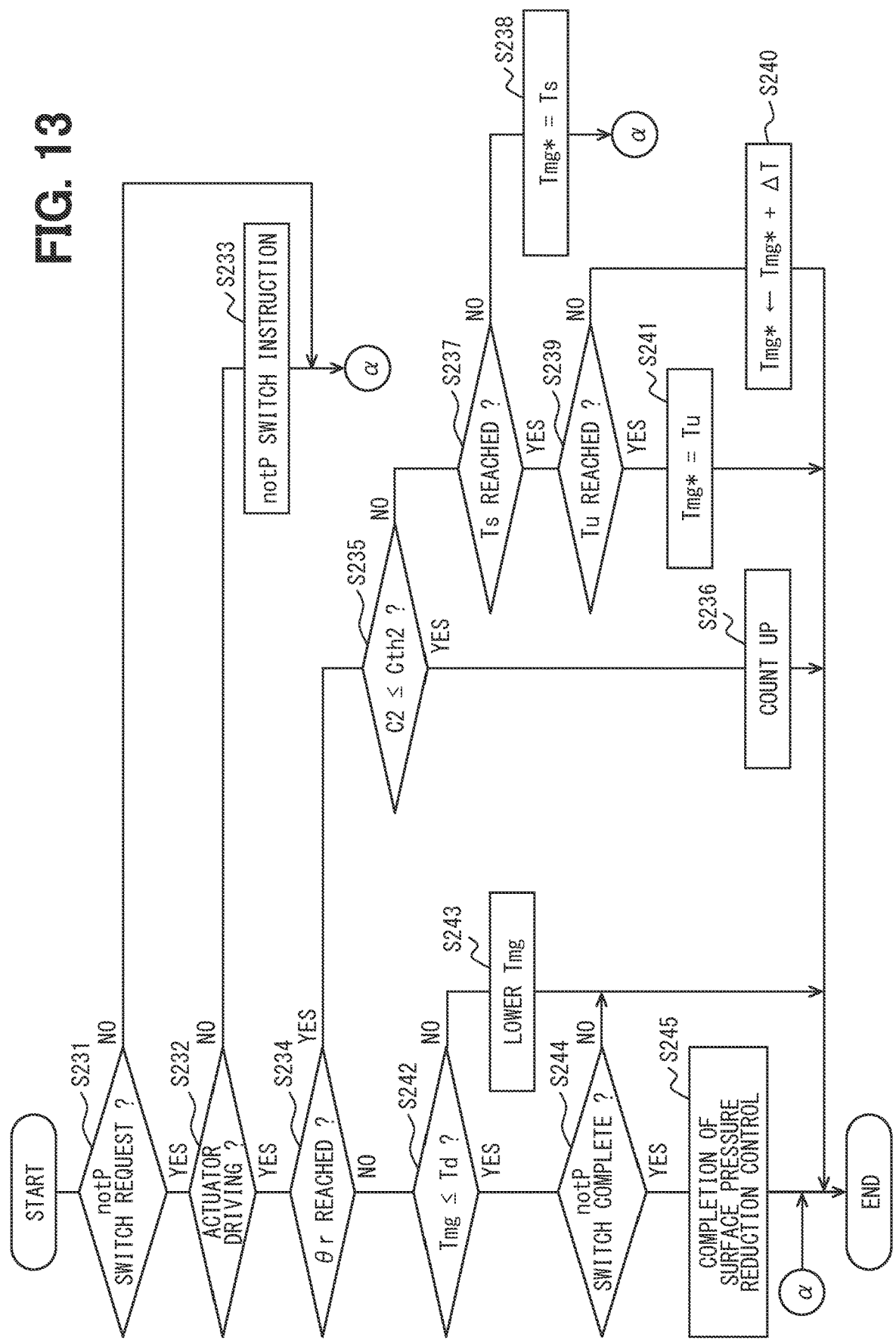
FIG. 13 is a flowchart of an MG control process according to a second embodiment.

The second embodiment will be described with reference to FIGS. 13 to 15. Since the second embodiment to the fifth embodiment mainly differ in the processing of the main motor 70, such a point is mainly described. In the MG control process shown in the flowchart of FIG. 13, the processes of S231 to S233 are the same as the processes of S201 to S203 in FIG. 11, respectively.

The control process S234 is performed when an affirmative determination (YES determination) is made in S232. In S234, the stuck determiner 822 determines whether or not the detection value θsns of the position sensor 68 has reached a reach determination value θr. FIG. 14 shows the detection value θsns of the position sensor 68 in an upper part and the output torque Tact of the motor 50 in a lower part. The output torque Tact is indicated by a solid line when no engaging surface pressure is generated, and is indicated by a broken line when an engaging surface pressure is generated in FIG. 14.

Figure 14:
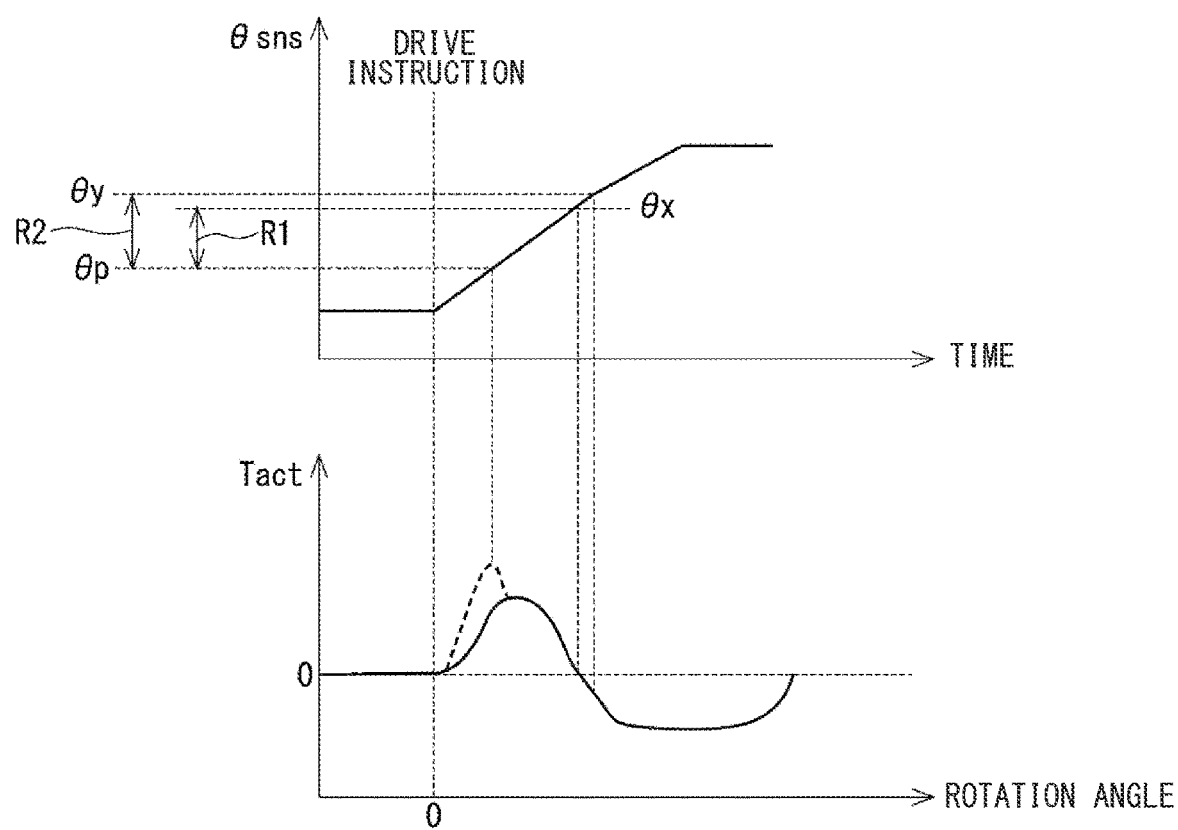
FIG. 14 is a diagram for explaining a setting of a reach determination value according to the second embodiment.

As shown in the lower part of FIG. 14, since the motor shaft 505 leads the output shaft 15 in a range until the detent roller 26 goes over the peak portion 215 of the detent plate 21, the output torque Tact of the motor 50 becomes positive. When the detent roller 26 gets over the peak portion 215, the spring force of the detent spring 25 leads the output shaft 15, making the output torque Tact negative. Designating that (i) the detection value θsns of the position sensor 68 at the timing when the detent roller 26 goes over the peak portion 215 is an attraction start position θx, and (ii) the detection value θsns that is a peak of the engaging surface pressure is a peak position θp, the reach determination value θr is set within a range R1 between the peak position θp and the attraction start position θx. Also, the reach determination value θr may be set within a range R2 between the peak position θp and the P range release position θy. The P range release position θy is a position where the detection value of the range sensor 37 switches from P to notP.

Returning to FIG. 13, when it is determined that the detection value θsns has reached the reach determination value θr (S234: YES), the process proceeds to S242. Affirmative determination (YES determination) is also made when the reach determination value θr has been passed. That is, if the reach determination value θr has been passed by driving the motor 50, the stuck caused by the engaging surface pressure component is not generated, thereby the out-of P-range is performable without driving the main motor 70. If it is determined that the detection value θsns has not reached the reach determination value θr (S234: NO), the process proceeds to S235.

In S235, the stuck determiner 822 determines whether or not the count value C2 is equal to or less than the reach determination threshold value Cth2 that is set according to a reach determination time Xth2. The reach determination time Xth2 in the present embodiment is set according to the time required for the detection value θsns to reach the reach determination value θr in case no engaging surface pressure is generated. If it is determined that the count value C2 is equal to or less than the reach determination threshold value Cth2 (S235: YES), the process proceeds to S236 and counts up the count value C2. If it is determined that the count value C2 is greater than the reach determination threshold value Cth2 (S235: NO), the process proceeds to S237. The processing of S237 to S245 is the same as the processing of S208 to S216 in FIG. 11, respectively.

Figure 15:
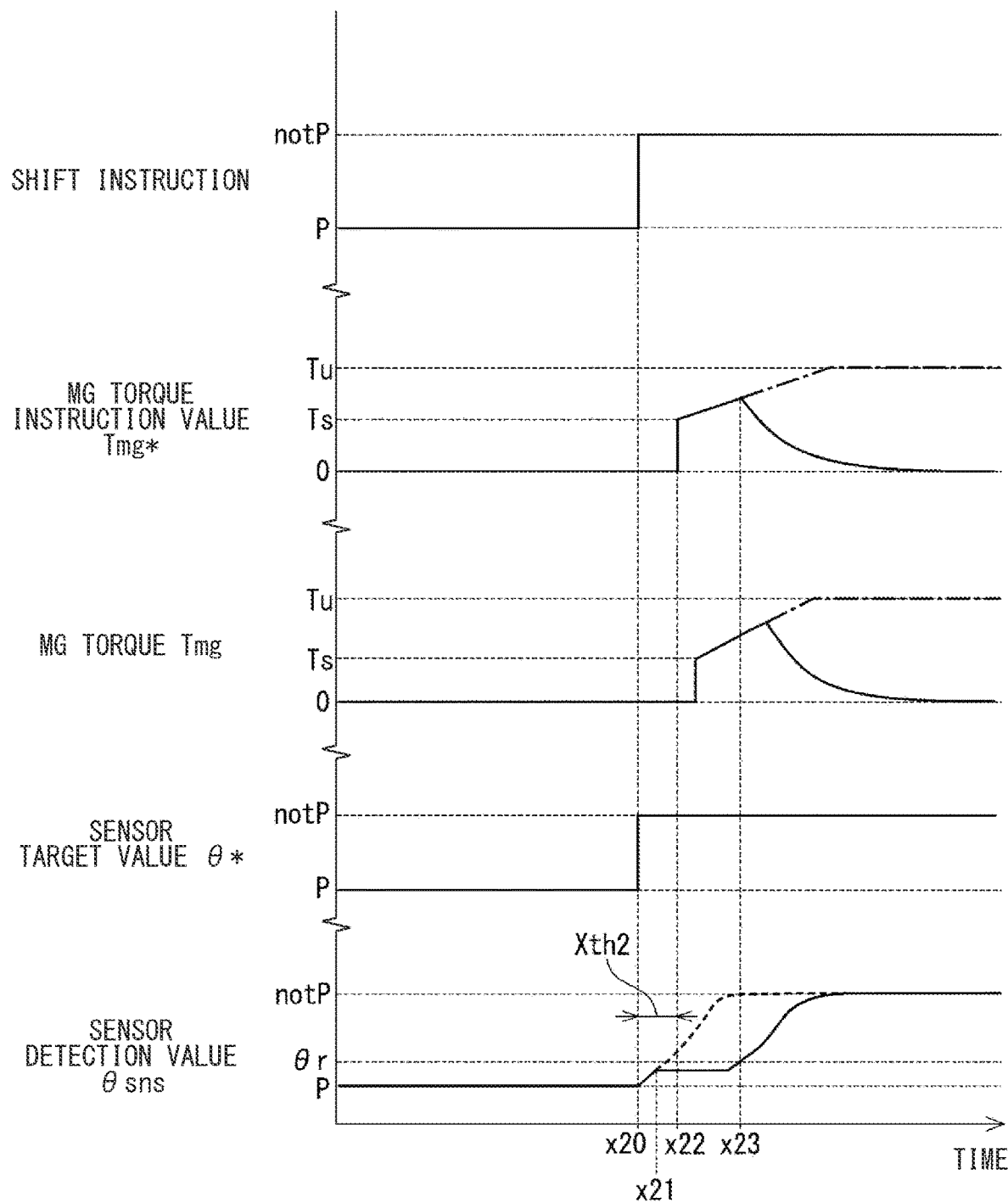
FIG. 15 is a time chart of an out-of P-range control process according to the second embodiment.

The out-of P-range control process of the present embodiment is described based on a time chart of FIG. 15. At time x20, when the shift instruction is switched from the P range to the notP range, driving the motor 50 is started and time measurement is started. At time x21, the detection value θsns of the position sensor 68 is stuck before the reach determination value θr.

Since the detection value θsns at time x22 when the reach determination time Xth2 has lapsed from the start of driving the motor 50 is smaller than the reach determination value θr, it is determined that the actuator 40 is stuck, and the driving of the main motor 70 is started. At time x23, when the detection value θsns of the position sensor 68 reaches the reach determination value θr, the MG torque instruction value Tmg* starts to decrease. The details of the drive control of the main motor 70 are the same as in the above-described embodiment, so description thereof is omitted.

In the present embodiment, the stuck determiner 822 determines that the actuator 40 is stuck when the detection value of the position sensor 68 does not reach the reach determination value θr within the reach determination time Xth2. Thereby, the stuck of the actuator 40 is determined appropriately.

The vehicle drive system 90 includes the detent mechanism 20 having the detent plate 21, the detent roller 26 and the detent spring 25. The detent plate 21 is formed with a plurality of valley portions 211 and 212 and is connected to the parking lever 33. The detent roller 26 can move in the valley portions 211 and 212 by driving the actuator 40. The detent spring 25 biases the detent roller 26 in a direction to fit into the valley portions 211 and 212.

The reach determination value θr is set as a value between (i) the peak position θp at which the engaging surface pressure due to the load applied to the axle 95 reaches its peak, and (ii) the attraction start position θx, from which the detent roller 26 is movable by the biasing force of the detent spring 25 into the valley portion 212 corresponding to the notP range, which is a range other than the P range.

Also, the reach determination value θr may be set as a value between (i) the peak position θp at which the engaging surface pressure due to the load applied to the axle 95 peaks and (ii) the P range release position θy at which the P range is released. As a result, it is possible to appropriately set the reach determination value θr and appropriately determine the stuck of the actuator 40 due to the engaging surface pressure. The same advantages as the preceding embodiment(s) are achievable.

Third Embodiment

The third embodiment will be described with reference to FIG. 16. In the present embodiment, a reach determination time Xth2 is made to be variable according to (i) an actuator temperature tmp, which is the temperature of the actuator 40, and (ii) the input voltage V. Specifically, the lower the actuator temperature tmp is, the lower the responsiveness becomes, and the longer the time required to reach the peak position θp becomes. Further, when the input voltage V is low, the time required to reach the peak position θp also becomes longer.

Figure 16:
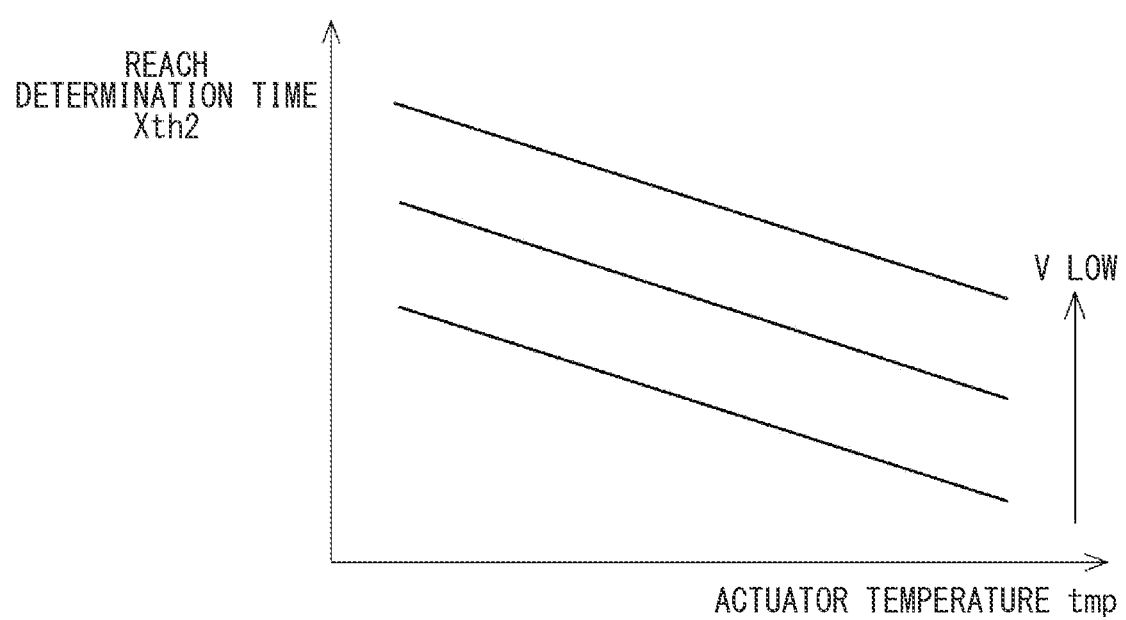
FIG. 16 is a graph for explaining a setting of reach determination time according to a third embodiment.

Therefore, as shown in FIG. 16, the reach determination time Xth2 is set based on the actuator temperature tmp and the input voltage V by map calculation, for example. Specifically, the lower the input voltage V is, the longer the reach determination time Xth2 is set. Also, the lower the actuator temperature tmp is, the longer the reach determination time Xth2 is set.

Although three maps corresponding to the input voltage V are shown in FIG. 16, the number of maps may be two, or four or more. Also, the map may be non-linear, and the reach determination time Xth2 may be calculated using a function or the like, instead of using the map calculation. Further, the stuck determination time Xth1 in the first embodiment and the like may be made variable according to at least one of the actuator temperature tmp and the input voltage V.

The reach determination time Xth2, which is the determination time related to the stuck determination, is variable according to the temperature of the actuator 40. In the present embodiment, the value detected by the temperature sensor 69 is the actuator temperature tmp; however, the TM oil temperature may also be used, instead. Also, the reach determination time Xth2 is variable according to the input voltage V to the actuator 40. In such manner, the determination time for the stuck determination is appropriately set. Further, the same advantages as the preceding embodiment(s) are achievable.

Fourth Embodiment

Figure 17:
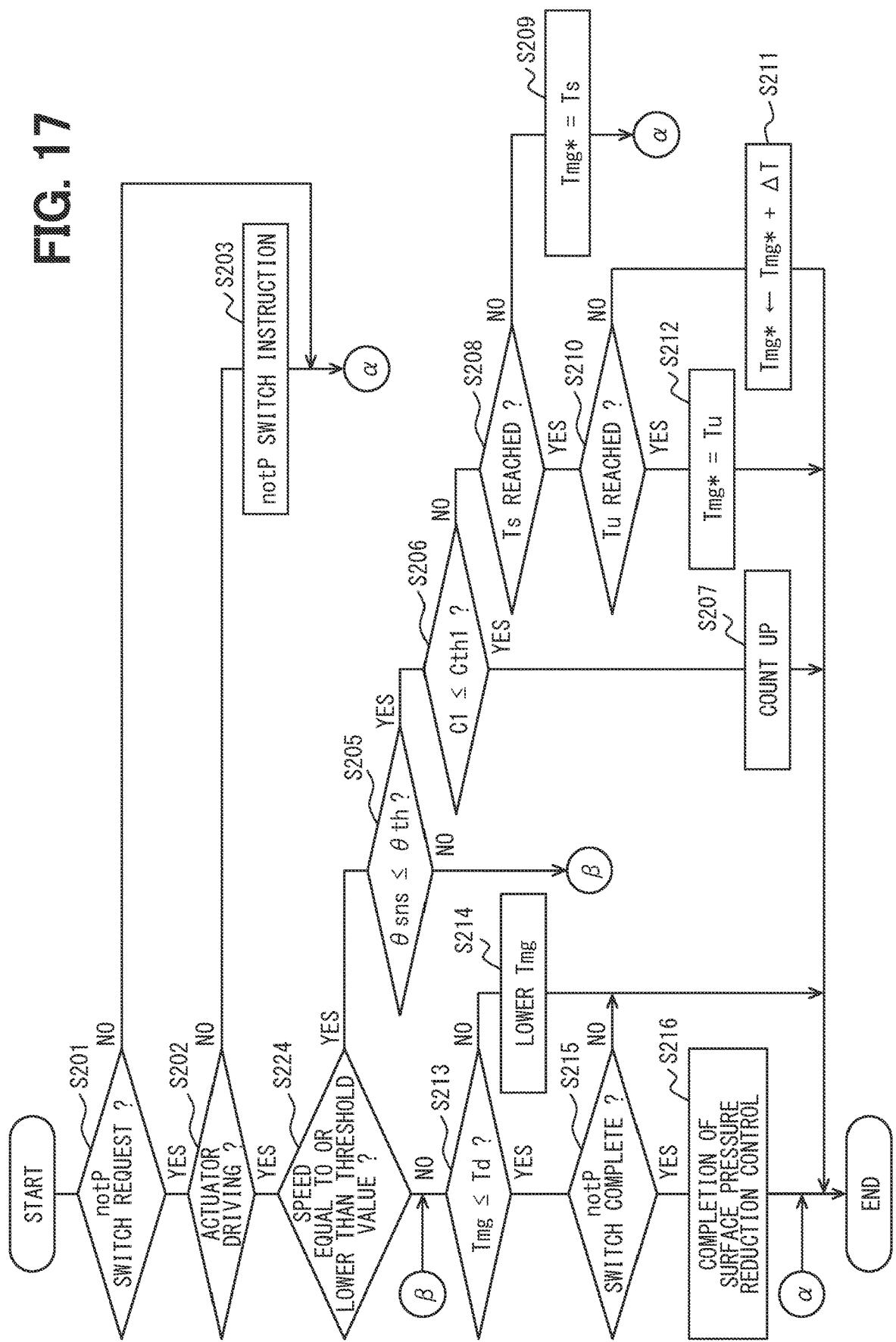
FIG. 17 is a flowchart of an MG control process according to a fourth embodiment.

The fourth embodiment will be described with reference to FIG. 17. In the MG control process of the present embodiment, S224, to which the process proceeds after an affirmative determination is made in S202, is different from that in the first embodiment, thereby the description focuses on such point. In S224, based on the detection value θsns of the position sensor 68, it is determined whether or not a rotation speed of the actuator 40 is equal to or lower than a speed threshold value. If it is determined that the rotation speed of the actuator 40 is equal to or lower than the speed threshold value (S224: YES), the process proceeds to S205. If it is determined that the rotation speed of the actuator 40 is greater than the speed threshold value (S224: NO), the process proceeds to S213. Other processing is the same as in FIG. 11.

In the present embodiment, the stuck determiner 822 determines that the actuator 40 is stuck when the drive speed (i.e., rotation speed) of the actuator 40 continues to be equal to or lower than a speed threshold value at least for the determination time. Thereby, the stuck of the actuator 40 is determined appropriately. The same advantages as the preceding embodiment(s) are achievable.

Fifth Embodiment

Figure 18:
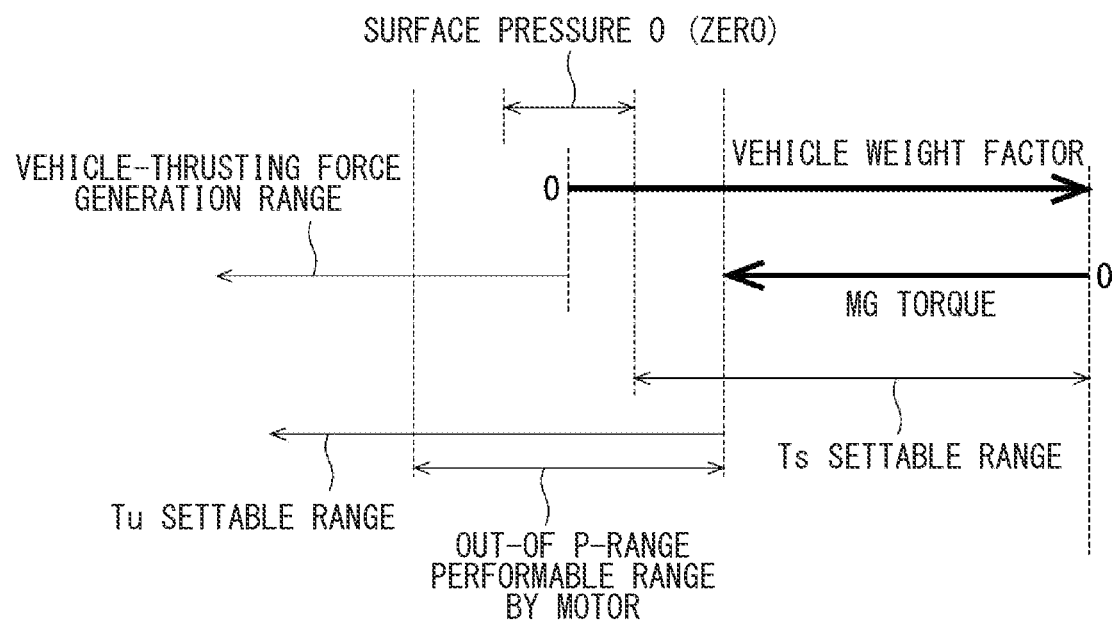
FIG. 18 is a diagram for conceptually explaining setting ranges of an initial torque value and an upper limit torque value according to a fifth embodiment.

The fifth embodiment will be described with reference to FIGS. 18 to 20. FIG. 18 is a diagram conceptually illustrating setting ranges of the initial torque value Ts and the upper limit torque value Tu. When the parking lock mechanism 30 is operated, the position at which the protrusion 331 of the parking lever 33 fits into the parking gear 35 is arbitrary within the range of backlash. When the protrusion 331 is positioned within the backlash range, no surface pressure is generated. Further, when the protrusion 331 and the parking gear 35 come into contact with each other due to an inclination of the vehicle 100 or the like, an engaging surface pressure corresponding to the vehicle weight component is generated (see FIG. 8).

Therefore, as described in the above embodiment, the main motor 70 is driven to reduce the engaging surface pressure generated due to the vehicle weight factors. The initial torque value Ts is set to a value of 0 or more and within a range of making the surface pressure as 0. Further, the upper limit torque value Tu is set so that a residual vehicle weight component, which is a difference between (i) the vehicle weight component and (ii) the MG torque Tmg, either (a) falls within an out-of P-range performable range of the motor 50 or (b) is greater than such a range.

Here, when the MG torque Tmg becomes greater than the vehicle weight component, a greater-than-vehicle-weight-component portion acts as a thrusting power of the vehicle 100. Therefore, in the present embodiment, a braking force is increased so that the vehicle 100 is not unintentionally thrusted by driving the main motor 70 in the out-of P-range control.

Figure 19:
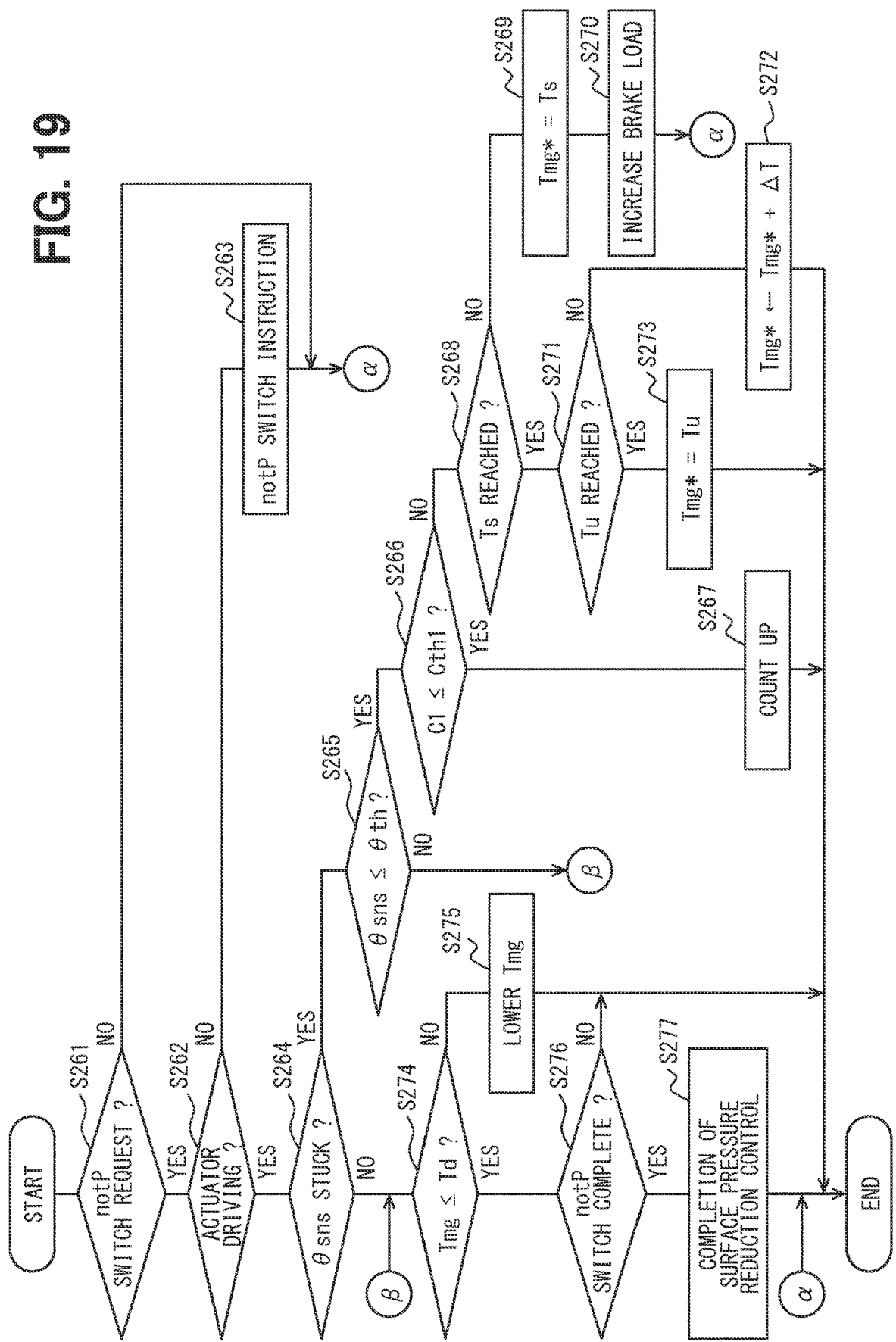
FIG. 19 is a flowchart of an MG control process according to the fifth embodiment.

The MG control process of the present embodiment is described based on a flowchart of FIG. 19. The processing of S261 to S269 is the same as the processing of S201 to S209 in FIG. 9. In S270 following S269, the vehicle control device 80 transmits, to the brake ECU 85, an instruction to increase a brake load. The processing of S271 to S277 is the same as the processing of S210 to S216 in FIG. 11. Here, an example of increasing the brake load in the MG control process of the first embodiment has been described. However, the brake load may be similarly increased in the second embodiment or the third embodiment.

Figure 20:
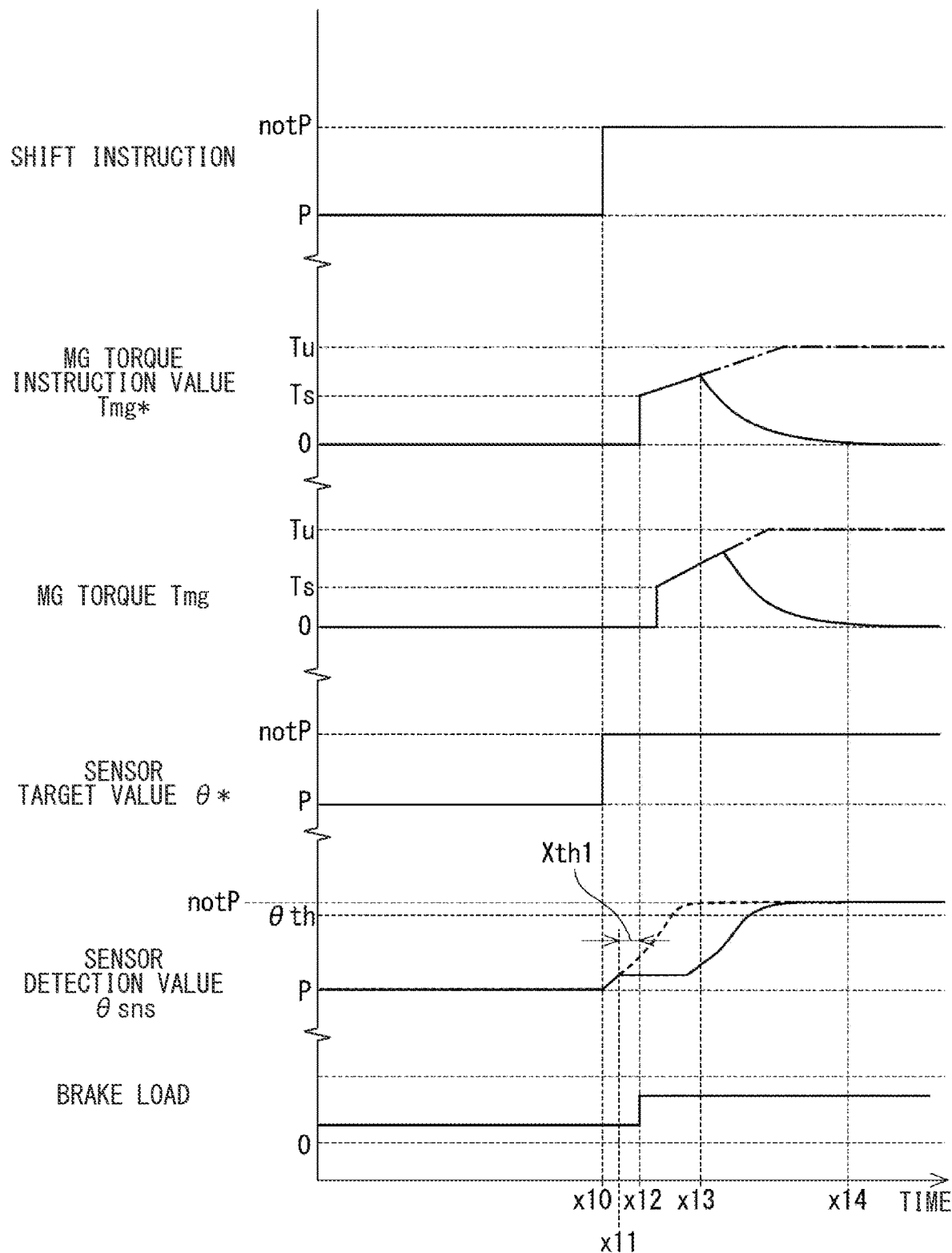
FIG. 20 is a time chart of an out-of P-range control process according to the fifth embodiment.

The out-of P-range control process of the present embodiment is described based on a time chart of FIG. 20. In FIG. 20, the horizontal axis is a common time axis, and from the top row, the shift instruction, the MG torque instruction value Tmg*, the MG torque Tmg, the target value θ* of the position sensor 68, the detection value θsns of the position sensor 68, and the brake load are shown. In the present embodiment, the brake load is increased at time x12 when it is determined that the actuator 40 is stuck and the drive of the main motor 70 is started. In FIG. 20, a state in which the brake load is increased continues, but at time x14 when the range switching is complete, the brake load may be returned to a pre-increase state.

In the present embodiment, the vehicle control device 80 makes the brake load greater when the main motor 70 is driven by the engaging surface pressure reduction control than when the engaging surface pressure reduction control is not performed. In such manner, unintended starting of the vehicle 100 is preventable. Further, the same advantages as the preceding embodiment(s) are achievable.

In the embodiment, the position sensor 68 corresponds to a "sensor unit" and a "rotation angle sensor," the magnetic field of the sensor magnet 65 that changes according to the rotation of the actuator 40 corresponds to a "physical quantity that changes according to the drive of the actuator," and the detent plate 21 corresponds to a "detent member," the detent spring 25 corresponds to a "biasing member," the detent roller 26 corresponds to an "engaging member," and the MG drive controller 821 corresponds to a "main motor drive controller."

(Other Embodiments)

The stuck of the actuator is determined based on (i) the update of the maximum value of the position sensor 68 in the first embodiment, (ii) the time to reach the reach determination value θr in the second embodiment, and (iii) the drive speed of the actuator 40 in the fourth embodiment. In other embodiments, the stuck of the actuator may be determined based on a combination of the above, i.e., when two or more of the above-described conditions are satisfied.

In the above embodiment, the sensor unit is the position sensor 68 that detects rotation of the actuator 40. In other embodiments, the sensor unit may be, for example, a current sensor or the like as long as it detects a value that changes according to the drive of the actuator.

In the above embodiment, the number of stages of speed reduction of the actuator is three. In other embodiments, the number of speed reduction stages may either be two, or four or more. Further, it is sufficient that the drive of the motor is transmitted to the output shaft, and the configuration of the mechanism for transmitting power from the motor to the output shaft may be different.

In the above embodiments, the motor is a brushed DC motor. In other embodiments, the motor may be other than a brushed DC motor. Further, in the above embodiment, there is a use environment region where the parking lock is not releasable by the actuator when the engaging surface pressure is generated. In other embodiments, there may be no "use environment region" where the parking lock is not releasable by the actuator. Even in such a case, the load on the actuator can be reduced by performing the engaging surface pressure reduction control by the main motor.

In the above embodiment, the detent plate, which is the detent member, is provided with two valley portions. In other embodiments, the number of the valley portions is not limited to two and may be three or more. Also, the configurations of the detent mechanism, the parking lock mechanism, and the like may be different from those of the above embodiments. In the above embodiment, the parking lock state is maintained by the detent mechanism 20. In other embodiments, instead of using the detent mechanism 20, a self-locking mechanism of the actuator 40 itself may be used to maintain the parking lock state.

The controllers (control units) and method thereof described in the present disclosure may be realized by a dedicated computer which is configured with a memory and a processor programmed to execute one or more particular functions embodied by computer programs stored the memory. Alternatively, the controllers (control units) described and the method thereof in the present disclosure may be realized by a dedicated computer configured as a processor with one or more dedicated hardware logic circuits. Alternatively, the controllers (control units) and the method in the present disclosure may be realized by one or more dedicated computers constituted as a combination of (i) the processor and the memory programmed to execute one or more functions and (ii) the processor with one or more hardware logic circuits. The computer programs may be stored, as instructions to be executed by a computer, in a tangible, non-transitory, computer-readable storage medium. The present disclosure is not limited to the above embodiments in any manner, but various modifications may be made further within the scope of the present disclosure without departing from the spirit thereof.

The present disclosure has been made in accordance with the embodiments. However, the present disclosure is not limited to such embodiments and configurations. The present disclosure also encompasses various modifications and variations within the scope of equivalents. Further, various combinations and formations, together with other combinations and formations adding thereto or subtracting therefrom one, more than one element, may also be considered to be encompassed in the scope and thought of the present disclosure.

What is claimed is:

1. A vehicle control device configured to control a vehicle drive system that includes:
    a main motor used as a drive source of a vehicle;
    a parking lock mechanism including a parking gear connected to an axle of the vehicle, and a parking lever that is engageable with the parking gear and is capable of locking a rotation of the axle by an engagement of the parking gear and the parking lever; and
    an actuator capable of driving the parking lever,
    the vehicle control device comprising:
    an actuator drive controller configured to control a drive of the actuator;
    a main motor drive controller configured to control a drive of the main motor; and
    a stuck determiner configured to determine that the actuator is stuck, based on a detection value of a rotation angle sensor that detects a physical quantity changed in accordance with a drive state of the actuator, wherein
    the main motor drive controller is configured to drive the main motor and to perform an engaging surface pressure reduction control in which an engaging surface pressure between the parking gear and the parking lever is reduced, when the struck determiner determines that the actuator is stuck in releasing a parking lock,
    the rotation angle sensor is configured to detect a rotation angle of the actuator,
    the stuck determiner is configured
    to set a shift determination threshold value according to a P range release position at which a P range is switched to a notP range,
    to perform a stuck determination in a range until the detection value of the rotation angle sensor reaches the shift determination threshold value, and to prevent from performing the stuck determination when the detection value of the rotation angle sensor exceeds the shift determination threshold value.

2. The vehicle control device according to claim 1, wherein
the stuck determiner determines that the actuator is stuck when a state in which the detection value of the rotation angle sensor is not updated in a rotation direction continues at least for a determination time.

3. The vehicle control device according to claim 1, wherein
the stuck determiner determines that the actuator is stuck when a drive speed of the actuator continues to be equal to or lower than a speed determination threshold value at least for a determination time.

4. The vehicle control device according to claim 2, wherein
the determination time for the stuck determination is variable according to a temperature of the actuator.

5. The vehicle control device according to claim 2, wherein
the determination time for the stuck determination is variable according to an input voltage to the actuator.

6. The vehicle control device according to claim 1, wherein
when the main motor is driven to perform the engaging surface pressure reduction control, a brake load is made greater than when the engaging surface pressure reduction control is not performed.

7. The vehicle control device according to claim 1, wherein
the actuator has a usage environment region in which the parking lock is not releasable when the engaging surface pressure is generated.

8. The vehicle control device according to claim 1, wherein
the stuck determiner determines that the actuator is stuck when the detection value of the rotation angle sensor does not reach a reach determination value for a determination time.

9. The vehicle control device according to claim 8, wherein
the vehicle drive system further includes a detent mechanism having:
a detent member with a plurality of valley portions formed therein and being connected to the parking lever;
an engaging member movable across the valley portions by the drive of the actuator; and
a biasing member biasing the engaging member in a direction to fit into the valley portion, and
the reach determination value is a value indicative of a position between (i) a peak position at which the engaging surface pressure due to a load applied to the axle peaks, and (ii) a position from which the engaging member is movable by the biasing force of the biasing member into the valley portion corresponding to the notP range, which is a range other than the P range.

10. The vehicle control device according to claim 8, wherein
the reach determination value is set as a value indicative of a position between (i) a peak position at which the engaging surface pressure due to a load applied to the axle peaks, and (ii) a position at which the P range is released.

11. A vehicle control device configured to control a vehicle drive system, the vehicle control device comprising:
a rotation angle sensor configured to detect a rotation angle of an actuator driving a parking lever of a vehicle;
a controller configured to control a drive of the actuator and to control a drive of a main motor driving the vehicle; and
a stuck determiner configured to determine that the actuator is stuck, based on a detection value of the rotation angle sensor, wherein
the controller is configured to drive the main motor and to perform an engaging surface pressure reduction control in which an engaging surface pressure between a parking gear and a parking lever of the vehicle is reduced, when the struck determiner determines that the actuator is stuck in releasing a parking lock,
the controller is configured to set a shift determination threshold value according to a P range release position at which a P range is switched to a notP range, and
the stuck determiner is configured
to perform a stuck determination in a range until the detection value of the rotation angle sensor reaches the shift determination threshold value, and
to prevent from performing the stuck determination when the detection value of the rotation angle sensor exceeds the shift determination threshold value.

12. The vehicle control device according to claim 11, wherein
in the engaging surface pressure reduction control, the controller is configured to make a brake load greater than that when the engaging surface pressure reduction control is not performed.

* * * * *